(12) United States Patent
Thangadural et al.

(10) Patent No.: US 10,497,959 B2
(45) Date of Patent: Dec. 3, 2019

(54) CHEMICALLY STABLE PROTON CONDUCTING DOPED BACEO$_3$

(71) Applicant: UTI Limited Partnership, Calgary, Alberta (CA)

(72) Inventors: Venkataraman Thangadural, Calgary (CA); Kannan Ramaiyan, Calgary (CA); Kalpana Singh, Calgary (CA); Sukhdeep Gill, Calgary (CA)

(73) Assignee: UTI Limited Partnership, Calgary, Alberta (CA)

( * ) Notice: Subject to any disclaimer, the term of this patent is extended or adjusted under 35 U.S.C. 154(b) by 260 days.

(21) Appl. No.: 15/323,596

(22) PCT Filed: Jul. 3, 2015

(86) PCT No.: PCT/CA2015/000425
§ 371 (c)(1),
(2) Date: Jan. 3, 2017

(87) PCT Pub. No.: WO2016/000067
PCT Pub. Date: Jan. 7, 2016

(65) Prior Publication Data
US 2017/0149082 A1    May 25, 2017

Related U.S. Application Data

(60) Provisional application No. 62/020,848, filed on Jul. 3, 2014.

(51) Int. Cl.
*C04B 35/50* (2006.01)
*H01M 4/00* (2006.01)
(Continued)

(52) U.S. Cl.
CPC ........ *H01M 8/1253* (2013.01); *C01G 25/006* (2013.01); *C01G 51/68* (2013.01);
(Continued)

(58) Field of Classification Search
CPC ........ H01B 1/08; H01M 4/90; H01M 8/1246; H01M 8/1253; H01M 8/126; C01G 25/00; C04B 35/50
See application file for complete search history.

(56) References Cited

U.S. PATENT DOCUMENTS

2011/0084237 A1    4/2011 Wachsman et al.

FOREIGN PATENT DOCUMENTS

GB          2424878 A  * 10/2006
WO   WO 2013/093044 A1   6/2013

OTHER PUBLICATIONS

Bi et al "BaZr0.8Y0.2O3-gamma-NiO Composite Anoidic Powders for Proton-Conducting SOFCs . . . ", Journal of the Electrochemical Society, 158 (7) B797-B803 (2011).*
(Continued)

*Primary Examiner* — Mark Kopec
(74) *Attorney, Agent, or Firm* — Leydig, Voit & Mayer, Ltd.

(57) ABSTRACT

Solid electrolytes, anodes and cathodes for SOFC. Doped BaCeO$_3$ useful for solid electrolytes and anodes in SOFCs exhibiting chemical stability in the presence of CO$_2$, water vapor or both and exhibiting proton conductivity sufficiently high for practical application. Proton-conducting metal oxides of formula $Ba_{1-x}Sr_xCe_{1-y1-y2-y3}Zr_{y1}Gd_{y2}Y_{y3}O_{3-\delta}$ where x, y1, y2, and y3 are numbers as follows: x is 0.4 to 0.6; y1 is 0.1-0.5; y2 is 0.05 to 0.15, y3 is 0.05 to 0.15, and cathode materials of formula II $GdPrBaCo_{2-z}Fe_zO_{5+\delta}$ where z is a number from 0 to 1, and δ is a number that varies such that the metal oxide compositions are charge neutral. Anodes, cathodes and solid electrolyte containing such materials. SOFC containing anodes, cathodes and solid electrolyte containing such materials.

20 Claims, 28 Drawing Sheets

(51) Int. Cl.

| | |
|---|---|
| H01M 8/00 | (2016.01) |
| H01M 8/1253 | (2016.01) |
| C01G 25/00 | (2006.01) |
| C01G 51/00 | (2006.01) |
| H01B 1/08 | (2006.01) |
| C04B 35/01 | (2006.01) |
| H01M 4/90 | (2006.01) |
| H01M 8/126 | (2016.01) |
| H01M 8/124 | (2016.01) |

(52) U.S. Cl.
CPC .............. *C04B 35/01* (2013.01); *C04B 35/50* (2013.01); *H01B 1/08* (2013.01); *H01M 4/9033* (2013.01); *H01M 8/126* (2013.01); *C01P 2002/34* (2013.01); *C01P 2002/72* (2013.01); *C01P 2002/82* (2013.01); *C01P 2002/88* (2013.01); *C01P 2004/01* (2013.01); *C01P 2004/03* (2013.01); *C01P 2006/40* (2013.01); *C04B 2235/3213* (2013.01); *C04B 2235/3215* (2013.01); *C04B 2235/3224* (2013.01); *C04B 2235/3225* (2013.01); *C04B 2235/3229* (2013.01); *C04B 2235/3248* (2013.01); *C04B 2235/3279* (2013.01); *C04B 2235/768* (2013.01); *C04B 2235/79* (2013.01); *H01M 2008/1293* (2013.01)

(56) References Cited

OTHER PUBLICATIONS

Lo Faro et al "Electrochemical investigation of a propane-fed solid oxide fuel cell based on a composite N-=perovskite anode catalyst", Applied Catalysis B; Environmental 89 (2009) 49-57.*
Agarwal et al. (1993) "Application of measurement models for analysis of impedance spectra," Corrosion. 49:278-289.
Atkinson et al. (2004) "Advanced anodes for high-temperature fuel cells," Nature Materials. 3:17-27.
Babilo et al. (2007) "Processing of yttrium-doped barium zirconate for high temperature proton conductivity," Journal of Material Research. 22:1322-1330.
Bhide et al. (1999) "Stability of $BaCeO_3$-based proton conductors in water containing atmospheres," Journal of the Electrochemical Society. 146:2038-2044.
Bi et al. (2011) "$BaZr_{0.8}Y_{0.2}O_{3-\sigma}$-NiO Composite Anodic Powders for Proton-Conducting SOFCs Prepared by a Combustion Method," J. Electrochem. Soc. 158(7):B797-B803.
Boukamp (2004) "Electrochemical impedance spectroscopy in solid state ionics: recent advances," Solid State Ionics. 169:65-73.
Chu et al. (2012) "Opportunities and challenges for a sustainable energy future," Nature. 488:294-303.
Edwards et al. (2008) "Hydrogen and fuel cells: towards a sustainable energy future," Energy Policy. 36:4356-4362.
Essoumhi et al. (2008) "Synthesis and characterization of Ni-cermet/ proton conducting thin film electrolyte symmetrical assemblies," Solid State Ionics. 179:2155-2159.
Fabbri et al. (2011) "Chemically Stable Pr and Y Co-Doped Barium Zirconate Electrolytes with High Proton Conductivity for Intermediate-Temperature Solid Oxide Fuel Cells," Adv. Funct. Mater. 21:158-166.
Fabbri et al. (2010) "Electrode materials: a challenge for the exploitation of protonic solid oxide fuel cells," Sci. Technol. Adv. Mater. 11:044301. pp. 1-10.
Fabbri et al. (2010) "Materials challenges toward proton-conducting oxide fuel cells: a critical review," Chem. Soc. Rev. 39:4355-4369.
Fabbri et al. (2008) "Tailoring the chemical stability of $Ba(Ce_{0.8-x}Zr_x)Y_{0.2}O_{3-\sigma}$ protonic conductors for Intermediate Temperature Solid Oxide Fuel Cells (IT-SOFCs)," Solid State Ionics. 179:558-564.
Fabbri et al. (2011) "High-performance composite cathodes with tailored mixed conductivity for intermediate temperature solid oxide fuel cells using proton conducting electrolytes," Energy Environ. Sci. 4:4984-4993.
Fabbri et al. (2012) "Towards the Next Generation of Solid Oxide Fuel Cells Operating Below 600 ° C. with Chemically Stable Proton-Conducting Electrolytes," Adv. Mater. 24:195-208.
Gill et al. (Feb. 4, 2013) "Effect of Zr substitution for Ce in $BaCe_{0.8}Gd_{0.15}Pr_{0.05}O_{3-\sigma}$ on the chemical stability in $CO_2$ and water, and electrical conductivity," RSC Advances 3:3599-3605.
Glöckner et al. (1999) "Protons and other defects in $BaCeO_3$: a computational study," Solid State Ionics. 122:145-156.
Gorte et al. (2004) "Recent developments on anodes for direct fuel utilization in SOFC," Solid State Ionics. 175(1-4):1-6.
Haugsrud et al. (2006) "Proton conduction in rare-earth ortho-niobates and ortho-tantalates," Nat. Mater. 5:193-196.
Hung et al. (2009) "Phase stability and conductivity of $Ba_{1-y}Sr_yCe_{1-x}Y_xO_{3-\sigma}$ solid oxide fuel cell electrolyte," Journal of Power Sources. 193:155-159.
Iwahara et al. (2000) "Electrochemical dehumidification using proton conducting ceramics," Solid State Ionics. 136-137:133-138.
Iwahara et al. (1983) "Galvanic cell-type humidity sensor using high temperature-type proton conductive solid electrolyte," Journal of Applied Electrochemistry. 13:365-370.
Iwahara et al. (1981) "Proton conduction in sintered oxides and its application to steam electrolysis for hydrogen production," Solid State Ionics. 3-4:359-363.
Kannan et al. (Jul. 4, 2013) "Chemically stable proton conducting doped $BaCeO_3$—no more fear to SOFC wastes," Sci. Rep. 3:2138 pp. 1-5.
Kannan et al. (2012) "$BaCe_{0.85-x}Zr_xSm_{0.15}O_{3-\sigma}$ (0.01 < x < 0.3) (BCZS): Effect of Zr Content in BCZS on Chemical Stability in $CO_2$ and $H_2O$ Vapor, and Proton Conductivity," Journal of the Electrochemical Society. 160:F18-F26.
Kim et al. (2010) "Effect of Fe substitution on the structure and properties of $LnBaCo_{2-x}Fe_xO_{5+\sigma}$ (Ln=Nd and Gd) cathodes," J. Power Sources. 195:6411-6419.
Kreuer (2003) "Proton-conducting oxides," Annual Review of Materials Research. 33:333-359.
Lee (Aug. 21, 2013) "Strontium doping effect on phase homogeneity and conductivity of $Ba_{1-x}Sr_xCe_{0.6}Zr_{0.2}Y_{0.2}O_{3-\sigma}$ proton-conducting oxides," International Journal of Hydrogen Energy. 38:11097-11103.
Liu et al. (2012) "A new neodymium-doped $BaZr_{0.8}Y_{0.2}O_{3-\sigma}$ as potential electrolyte for proton-conducting solid oxide fuel cells," Journal of Membrane Science. 415:391-398.
Malavasi et al. (2010) "Oxide-ion and proton conducting electrolyte materials for clean energy applications: structural and mechanistic features," Chem. Soc. Rev. 38:4370-4387.
Mather et al. (2003) "Synthesis and characterisation of $Ni-SrCe_{0.9}Yb_{0.1}O_{3-\sigma}$ cermet anodes for protonic ceramic fuel cells," Solid State Ionics. 158:333-342.
Matsumoto et al. (2007) "Relation between electrical conductivity and chemical stability of $BaCeO_3$-based proton conductors with different trivalent dopants," Electrochemical and Solid-State Letters. 10:677-680.
Mukundan et al. (2001) "Electrochemical Characterization of Mixed Conducting $Ba(Ce_{0.8-y}PryGd_{0.2})O_{2.9}$ Cathodes," Journal of Electrochemical Society. 148:A82-A86.
Pagnier et al. (2000) "A neutron diffraction study of $BaCe_xZr_{1-x}O_3$," The European Physical Journal—Applied Physics. 9:1-9.
Park et al. (2000) "Direct oxidation of hydrocarbons in a solid-oxide fuel cell," Nature. 404(6775):265-267.
Peng et al. (2010) "Cathode processes and materials for solid oxide fuel cells with proton conductors as electrolytes," J. Mater. Chem. 20:6218-6225.
Pergolesi et al. (2000) "High proton conduction in grain-boundary-free yttrium-doped barium zirconate films grown by pulsed laser deposition," Nature Materials. 9:846-852.
Rainwater et al. (2012) "A more efficient anode microstructure for SOFCs based on proton conductors," International Journal of Hydrogen Energy. 37:18342-18348.

(56) References Cited

OTHER PUBLICATIONS

Roedel et al. (2008) "On the local sensitivity of different IR techniques: Ba species relevant in NOx storage-reduction," Phys. Chem. Chem. Phys. 10:6190-6198.
Ryu et al. (1999) "Chemical stability and proton conductivity of doped $BaCeO_3$—$BaZrO_3$ solid solutions," Solid State Ionics. 125:355-367.
Sanson et al. (2008) "Influence of pore formers on slurry composition and microstructure of tape cast supporting anodes for SOFCs," Journal of the European Ceramic Society. 28:1221-1226.
Schober et al. (2000) "Water vapor solubility and electrochemical characterization of the high temperature proton conductor $BaZr_{0.9}Y_{0.1}O_{2.95}$," Solid State Ionics. 127:351-360.
Schober (2003) "Applications of oxidic high-temperature proton conductors," Solid State Ionics. 162-163:277-281.
Schober et al. (2005) "Entry and exit of water vapor in bulk ceramic proton conductors," Solid State Ionics. 176:357-362.
Schober et al. (1977) "Dilatometry of the high-temperature proton conductor $Ba_3Ca_{1.18}Nb_{1.82}O_{9-\alpha}$," Solid State Ionics. 100:173-181.
Serra et al. (2007) "Thin-film proton $BaZr_{0.85}Y_{0.15}O_3$ conducting electrolytes: toward intermediate-temperature solid oxide fuel cell alternative," J. Am. Ceram. Soc. 90:2082-2089.
Singh et al. (Jun. 14, 2015) "Electrochemical Studies of $GdPrBaCo_2O_{5+\sigma}$ and $GdPrBaCoFeO_{5+\sigma}$ Cathodes for Oxide Ion and Proton Conducting Solid Oxide Fuel Cells," In; The 20$^{th}$ International Conference on Solids State Ionics, Jun. 14-19, 2015, Keystone, Colorado. Abstract No. A6.02.
Snijkers et al. (2004) Proton conductivity and phase composition in $BaZr_{0.9}Y_{0.1}O_{3-\sigma}$ Scripta Materialia. 50:655-659.
Song (2002) "Fuel processing for low-temperature and high-temperature fuel cells Challenges, and opportunities for sustainable development in the 21st century," Catalysis Today. 77:17-49.
Sorrell et al. (2012) "Shaping the global oil peak: a review of the evidence on field sizes, reserve growth, decline rates and depletion rates," Energy. 37:709-724.
Suksamai et al. (2007) "Measurement of proton and oxide ion fluxes in a working Y-doped $BaCeO_3$ SOFC," Solid State Ionics. 178:627-634.
Taniguchi et al. (1992) "Proton conductive properties of gadolinium-doped barium cerates at high temperatures," Solid State Ionics. 53-56:998-1003.
Tao et al. (2003) "A redox-stable efficient anode for solid-oxide fuel cells," Nat. Mater. 2:320-323.
Thangadurai et al. (May 2015) "Anodes Derived from Fluorite-Type and Perovskite-Type Metal Oxides for SOFCs," In the 227th Electrochemical Society Meeting, May 24-28, 2015, Chicago, Illinois. Abstract No. 1624.
Wu et al. (1997) "Stability of $BaCe_{0.8}Gd_{0.2}O_3$ in a $H_2O$-Containing Atmosphere at Intermediate Temperatures," Journal of Electrochemical Society. 144:2170-2175.
Wu et al. (2005) "Atomistic study of doped BaCeO3: dopant site-selectivity and cation nonstoichiometry," Chemistry of Materials. 17:846-851.
Yajima et al. (1995) "Application of hydrogen sensor using proton conductive ceramics as a solid electrolyte to aluminum casting industries," Solid State Ionics. 79:333-337.
Yajima et al. (1991) "Protonic and oxide ionic conduction in $BaCeO_3$-based ceramics—effect of partial substitution for Ba in $BaCe_{0.9}O_{3-\alpha}$ with Ca," Solid State Ionics. 47:117-124.
Yang et al. (2009) "Enhanced Sulfur and Coking Tolerance of a Mixed Ion Conductor for SOFCs: $BaZr_{0.1}Ce_{0.7}Y_{0.2-x}Yb_xO_{3-\sigma}$," Science. 326:126-129.
Zhao et al. (2005) "Dependence of polarization in anode-supported solid oxide fuel cells on various cell parameters," Journal of Power Sources 141:79-95.
Zhe et al. (2002) "Study on new copper-containing SOFC anode materials," Journal of Alloys and Compounds. 334:299-303.
Zuo et al. (2012) "Solid Oxide Fuel Cells," Ch. 2 In; Sol-Gel Processing for Conventional and Alternative Energy. Ed. Aparicio et al. Springer-Verlag. New York, New York. pp. 7-36.
Zuo et al. (2006) "$Ba(Zr_{0.1}Ce_{0.7}Y_{0.2})O_{3-\sigma}$ as an Electrolyte for Low-Temperature Solid-Oxide Fuel Cells," Adv. Mater. 18:3318-3320.
International Search Report with Written Opinion corresponding to International Patent Application No. PCT/CA2015/000425, dated Oct. 9, 2015.

* cited by examiner

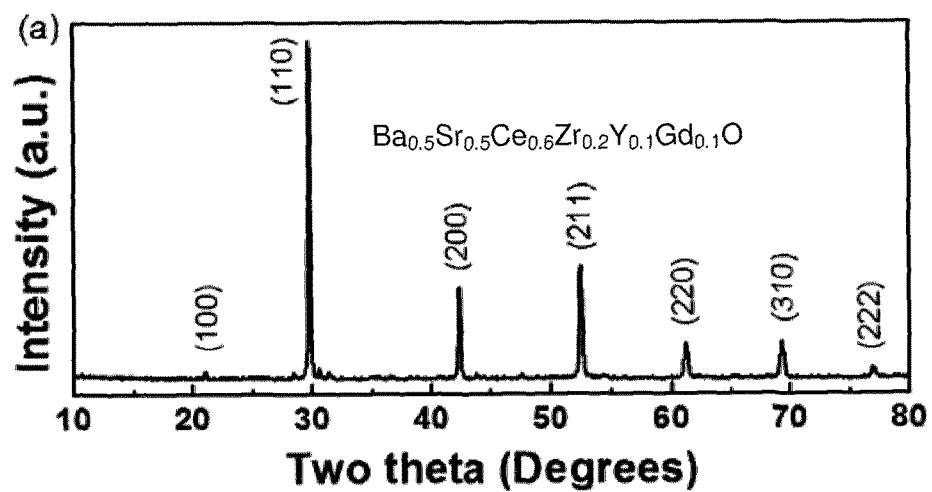
FIG. 1A
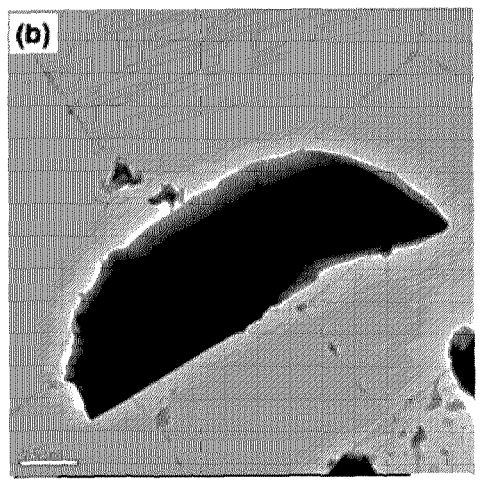 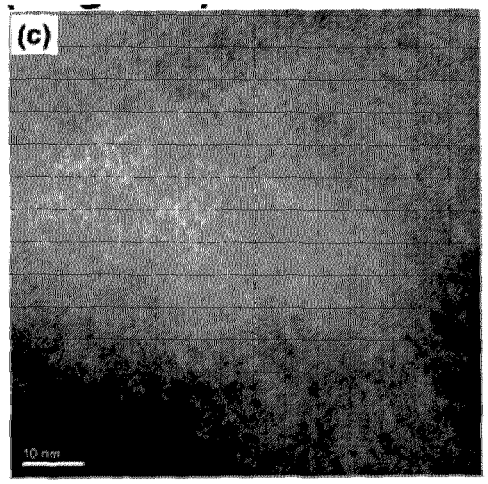
FIG. 1B                    FIG. 1C

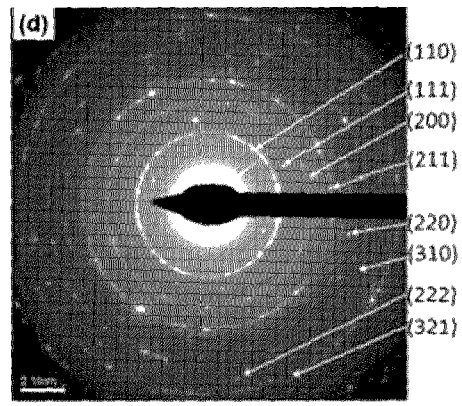
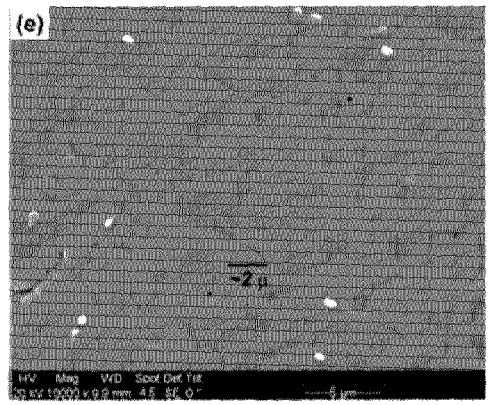
FIG. 1D  FIG. 1E
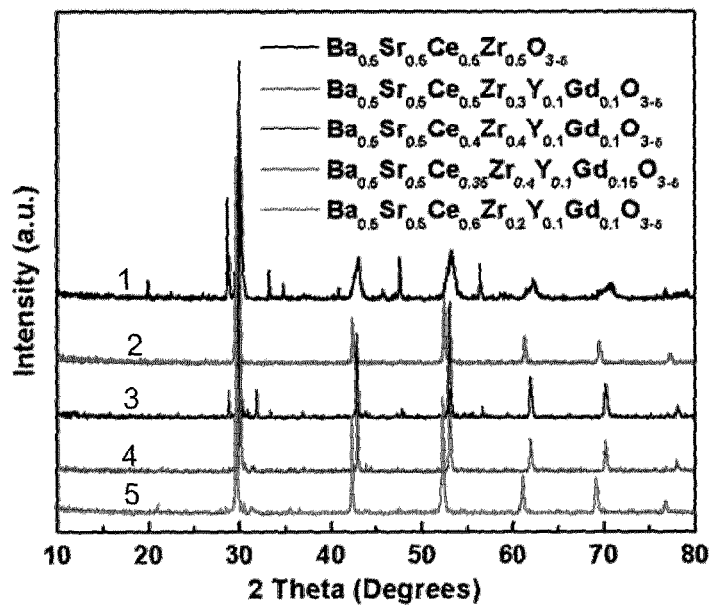
FIG. 1F

Anode/Proton conductor/Cathode
Temperature = 400-700 °C

$$O_2 + 4H^+ + 4\,e^- \longrightarrow 2\,H_2O \quad \text{Cathode}$$
$$2H_2 \longrightarrow 4H^+ + 4e^- \quad \text{Anode}$$
$$O_2 + 2H_2 \longrightarrow 2H_2O \quad \text{Overall}$$

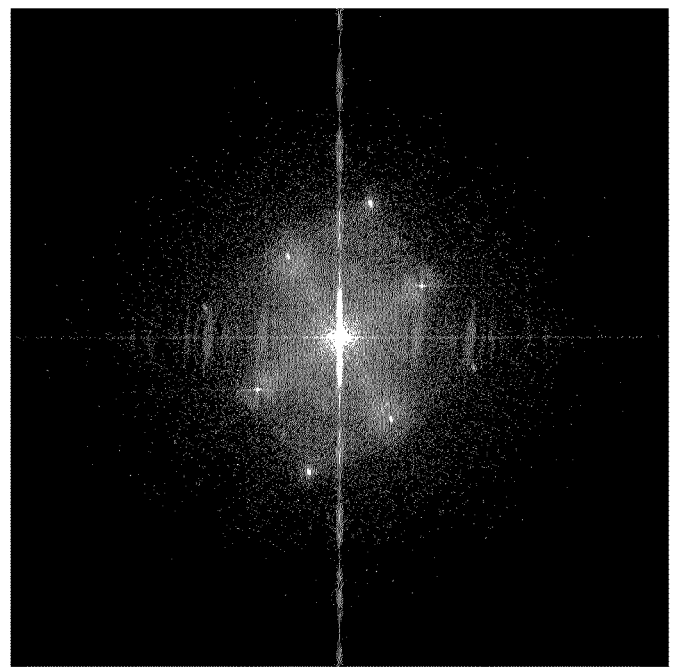
FIG. 14
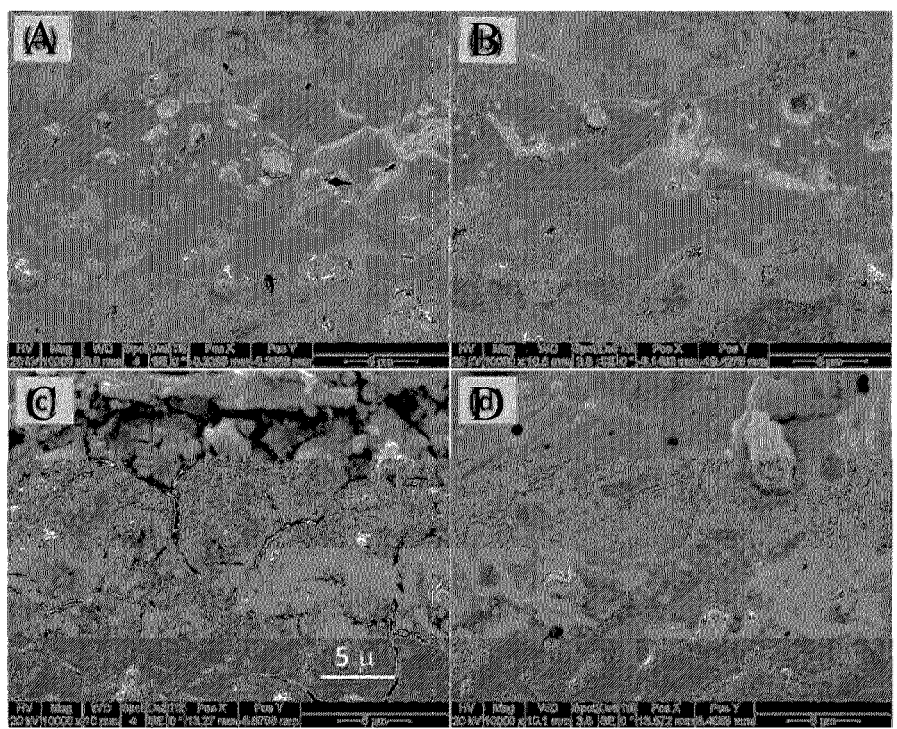
FIGs. 15A-D

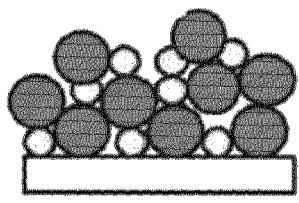 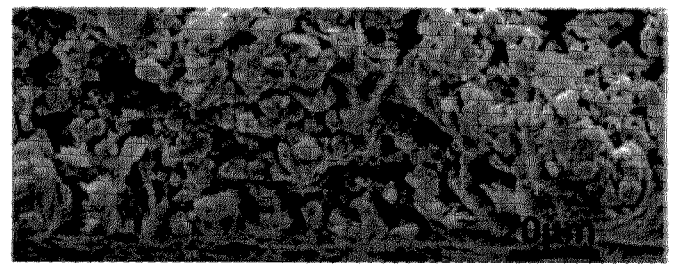
FIG. 17B
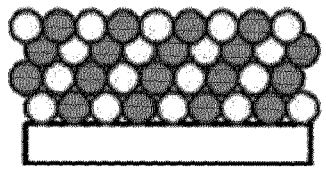 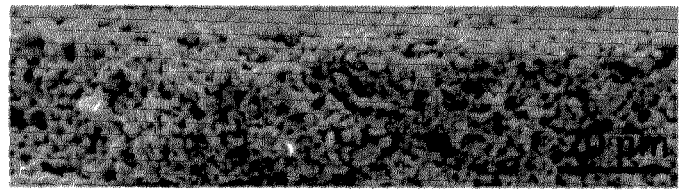
FIG. 17C

FIG. 24
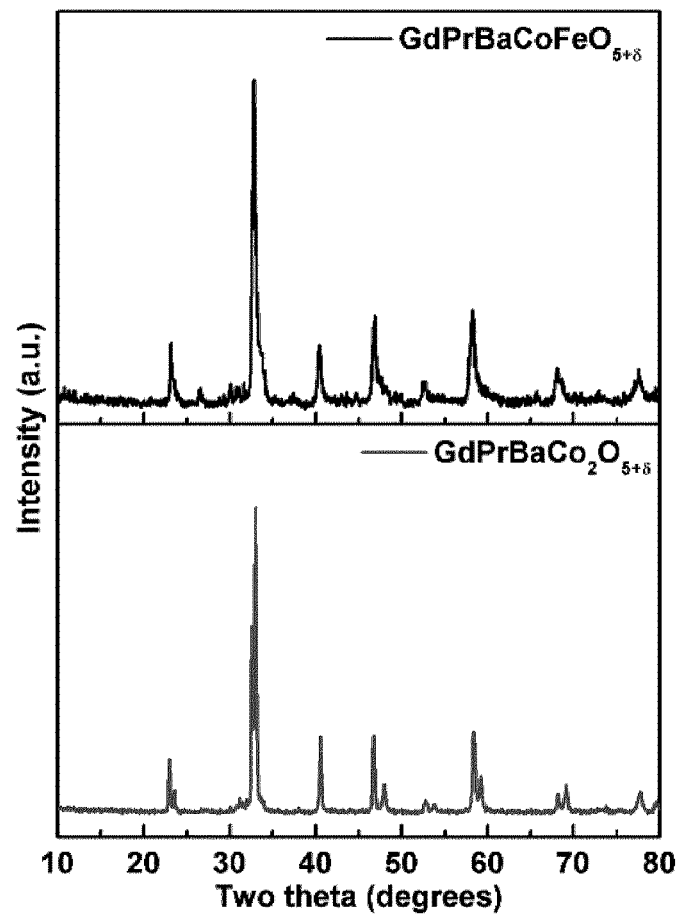
FIG. 25A
FIG. 25B

CHEMICALLY STABLE PROTON CONDUCTING DOPED BACEO$_3$

CROSS-REFERENCE TO RELATED APPLICATIONS

This application is a U.S. National Stage Application under 35 U.S.C. § 371 of International Application No. PCT/CA2015/000425, filed Jul. 3, 2015, which claims the benefit of and priority to U.S. Provisional Application No. 62/020,848, filed Jul. 3, 2014, both of which are herein incorporated by reference in their entirety to the extent not inconsistent herewith.

BACKGROUND OF THE INVENTION

The finite nature of oil resources and the ever-growing energy demand necessitate alternative energy conversion technology that is highly efficient and free of greenhouse gas emissions [1, 2]. Solid oxide fuel cells (SOFCs) utilizing oxide-ion conductors (e.g., Y-doped $ZrO_2$ (YSZ)) due to higher efficiency (up to ~80%), fuel flexibility, and combined heat power generation are being considered as alternative over conventional greenhouse gas emission system for stationary and mobile applications [3, 4]. However, high operating temperatures, typically between 800-1000° C., results in material degradation, coking in case of direct hydrocarbon fuels and sulfur poisoning in Ni-based cermet electrodes. The operating temperature of SOFCs is commonly dictated by the choice of electrolytes; hence, efforts have been focused on intermediate temperature (IT) (400-700° C.) ceramic proton conductors to reap many benefits especially with economic metal interconnects [5-8].

Among the known electrolytes, aliovalent-doped $BaCeO_3$ (BCs) have demonstrated high proton conductivity (~$10^{-2}$ Scm$^{-1}$ at 700° C.), but, their poor chemical stability to SOFC by-products such as $H_2O$ and $CO_2$ has restricted them from being considered for proton conducting SOFCs [9, 10].

Persistent efforts to improve the key features of BCs have shown that doping with metal ions having larger ionic size compared to Ce increases proton conductivity, while doping with metal having higher electronegativity increases chemical stability. Yttrium (Y) remains one of the best candidates for doping for Ce in BCs, whereas ytterbium (Yb) and praseodymium (Pr) co-doping exhibited mixed ionic and electronic conduction [11, 12]. Comparison of ionic radii and electronegativity (see Table 1) suggests that both $Y^{3+}$ and $Gd^{3+}$ may be useful for Ce site doping in BCs. Additionally, computational studies using a 'mean field approach' where $Gd^{3+}$ and $Y^{3+}$ have showed the lowest solution energy for doping in the Ce site [13]. On the other hand, Sr-doping for Ba is proven to increase the phase stability under water vapor [14]. In contrast to BCs, $BaZrO_3$-based proton conductors show appreciable chemical stability, but have poor sinter-ability and normally need very high temperature sintering (>1700° C.) that makes them unsuitable for electrode supported SOFCs [15-17].

US 20110084237 relates to membranes of proton-conducting ceramic said to be useful for conversion of hydrocarbon and steam into hydrogen comprising a certain porous support coated with a film of a perovskite-type oxide of the formula $SrCe_{1-x-y}Z_xM_yO_{3-\delta}$, where M is at least one of Ti, V, Cr, Mn, Fe, Co, Ni, Cu, Nb, Mo, W, Pr, Nd, Pm, Sm, Eu, Gd, Tb, Dy, Ho, Er, Tm, and Yb, x is 0 to about 0.15 and y is about 0.1 to about 0.3.

WO 2013/093044 relates inter alia to a perovskite type transition metal oxide which has formula

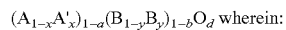

$(A_{1-x}A'_x)_{1-a}(B_{1-y}B'_y)_{1-b}O_d$ wherein:

A and A' are different from each other and A and A' each independently comprises at least one element selected from the group consisting of strontium (Sr), yttrium (Y), samarium (Sm), cerium (Ce), bismuth (Bi), lanthanum (La), gadolinium (Gd), neodymium (Nd), praseodymium (Pr), calcium (Ca), barium (Ba), magnesium (Mg) and lead (Pb).;
B and B' are different from each other, and B and B' each independently comprises at least one element selected from the group consisting of transition metal ions such as titanium (Ti), vanadium (V), manganese (Mn), cobalt (Co), iron (Fe), chromium (Cr), nickel (Ni) or copper (Cu); and gallium (Ga);
x is between 0 and 1;
y is between 0 and 1, and
a, b and d correspond to site deviations from stoichiometry, which are reported to be useful in metal-air batteries.

Zuo et al. 2009 [26] relates to $Ba(Zr_{0.1}Ce_{0.7}Y_{0.2})O_{3-\delta}$ as an electrolyte for low temperature solid oxide fuel cells. This reference is incorporated by reference herein in its entirety for descriptions of proton-conducting solid oxide fuel cells and assessments of electrolyte materials.

SUMMARY OF THE INVENTION

The invention provides mixed metal oxide and metal composites thereof for use as solid electrolytes and anodes in SOFC, as well as additional mixed metal oxide materials for use as cathodes in SOFC.

More specifically, the invention provides doped $BaCeO_3$ exhibiting excellent chemical stability in the presence of $CO_2$, water vapor or both and exhibiting proton conductivity sufficiently high for use in practical proton conducting SOFCs. More specifically, $BaCeO_3$ is doped with a combination of Sr, Zr, Gd and Y ions. Yet more specifically, a portion of the Ba is replaced with Sr, and a portion of the Ce is replaced with a combination of Zr, Gd and Y.

In embodiments, the doped $BaCeO_3$ proton-conducting metal oxides are employed to prepare a dense, non-gas-permeable, proton-conducting, solid electrolyte for a proton-conducting SOFC. In other embodiments, the doped $BaCeO_3$ proton-conducting metal oxides are useful as anodes or components of anodes of SOFC.

The invention additionally provides metal composites of the doped $BaCeO_3$ proton-conducting metal oxides, particularly those in which the metal is Ni, Cu, Au, Ag or mixtures thereof. In embodiments, the metal composites of the doped $BaCeO_3$ proton-conducting metal oxides are useful as anodes or components of anodes in SOFC.

The invention additionally provides certain mixed metal oxide cathode materials for use in SOFC. In embodiments, the cathode materials are employed in combination with a solid electrolyte of the invention comprising doped $BaCeO_3$ proton-conducting metal oxides. In an embodiment, the cathode materials are employed in combination with an anode which comprises doped $BaCeO_3$ proton-conducting metal oxides or metal composites thereof. In other embodiments, the cathode materials are employed in combination with a solid electrolyte of the invention which is a doped $BaCeO_3$ proton-conducting metal oxide and an anode which comprises a doped $BaCeO_3$ proton-conducting metal oxide.

The invention further provides SOFC employing solid electrolytes, anodes and cathodes of the invention as described herein.

The invention further provides a method for producing electrical energy from a proton conducting solid oxide fuel cell of the invention which comprises an anode comprising a proton-conducting metal oxide of formula I and/or a dense proton-conducting electrolyte comprising or consisting of a proton-conducting metal oxide of formula I.

Other aspects of the invention will be apparent to one of ordinary skill in the art on review of the following detailed description, examples and drawings.

BRIEF DESCRIPTION OF THE DRAWINGS

FIGS. 1A-F. Phase characterization and morphological studies of Perovskite I. (A) PXRD pattern obtained for the as-prepared, $Ba_{0.5}Sr_{0.5}Ce_{0.6}Zr_{0.2}Gd_{0.1}Y_{0.1}O_{3-\delta}$ (Perovskite I) revealing the formation of cubic perovskite structure with a very small impurity peak near 2θ values of 30°, (B) TEM image of Perovskite I (C) HRTEM (D) SAED pattern of Perovskite I with the corresponding crystal planes indexed again indicating the formation of single phase and (E) SEM image of Perovskite I showing grains in the range of 2-3 micron and revealing the dense nature of the pellet, (F) PXRD pattern of additional as-prepared powders synthesized at 1450° C., each showing formation of a cubic perovskite structure.

FIG. 2C is a compilation of PXRD patterns of as-prepared powders (compositions indicated) after exposure to water vapor at 90° C. for 24 h. FIG. 2D is a compilation of PXRD patterns of as-prepared powders (compositions as indicated) after exposure to water vapor at 90° C. for 168 h. FIG. 2E is a compilation of PXRD patterns of as-prepared powders (compositions as indicated) after exposure to $CO_2$ at 800° C. for 24 h.

FIG. 3A is a Nyquist plot obtained for Perovskite I under different conditions revealing the increase in resistance in the order of $H_2$+3% $H_2O$, air+3% $H_2O$, air, $N_2$+3% $H_2O$, and $N_2$+3% $D_2O$ at 600° C. The lines passing through the data points are fitting results. FIG. 3B is an Arrhenius plot of Perovskite I in various environments along with that of GDC measured in air revealing increased conductivity for Perovskite I compared to GDC. Activation energy of 55 kJmol$^{-1}$ is observed under $H_2$+3% $H_2O$ environments. FIG. 3C is a similar plot of various compositions as indicated in wet $H_2$.

as shown in FIG. 3A (A) under air, air+3% $H_2O$, $N_2$+3% $H_2O$ and $N_2$+3% $D_2O$ (B) under $H_2$+3% $H_2O$.

FIG. 14 illustrates the FFT pattern obtained with the HRTEM given in FIG. 1C further iterating the cubic nature of Perovskite I.

FIGS. 15A-D illustrate SEM images of Perovskite I powder chunks before and after various stability measurements (A) as-prepared, (B) after exposure to $H_2O$ vapor for 24 h, (C) after exposure to $H_2O$ vapor for 168 h and (D) after exposure to $CO_2$ at 800° C. for 24 h. The images reveal no significant change after exposure to both $H_2O$ vapor and $CO_2$ for 24 h. However, upon continues exposure to $H_2O$ vapor for 24 h, cracks have appeared at the regions of grain boundary suggesting the water incorporation through these regions.

FIGS. 17A-17C illustrate a comparison of methods for forming metal-proton-conducting metal oxide composites. FIG. 17A is a scheme comparing the methods used herein to prepare metal-proton-conducting metal oxide composites useful as anode materials in proton-conducting SOFC. The combustion method is believed to provide a more uniform composition. FIG. 17B is a cross-section SEM micrograph of NiO(40)-BSCZGY prepared by the conventional mechanical mixing method, where the size bar is 20 micron. FIG. 17C is a cross-section SEM micrograph of NiO(40)-BSCZGY prepared by the combustion route.

FIG. 19 A illustrated the cell employed where reduction is conducted at 900° C. for 3 hours. The volume ratio of Ni to proton-conducting metal oxide is 40:60. The micrographs show no delamination.

FIG. 20A illustrates the cell used where reduction is carried out at 900° C. for 3 hours. The micrographs show the porous structure of the anode.

FIG. 24 is a schematic diagram showing preparation of symmetrical cells of the invention using proton conducting electrolyte of formula I (for example, $Ba_{0.5}Sr_{0.5}Ce_{0.6}Zr_{0.2}Gd_{0.1}Y_{0.1}O_{3-\delta}$, BSCZGY) and cathode materials of the invention (for example, $GdPrBaCo_2O_{5+\delta}$).

FIGS. 25 A and B are PXRD of as-prepared $GdPrBaCo_2O_{5+\delta}$ and $GdPrBaCoFeO_{5+\delta}$ powders, respectively.

DETAILED DESCRIPTION OF THE INVENTION

Figure 2A:
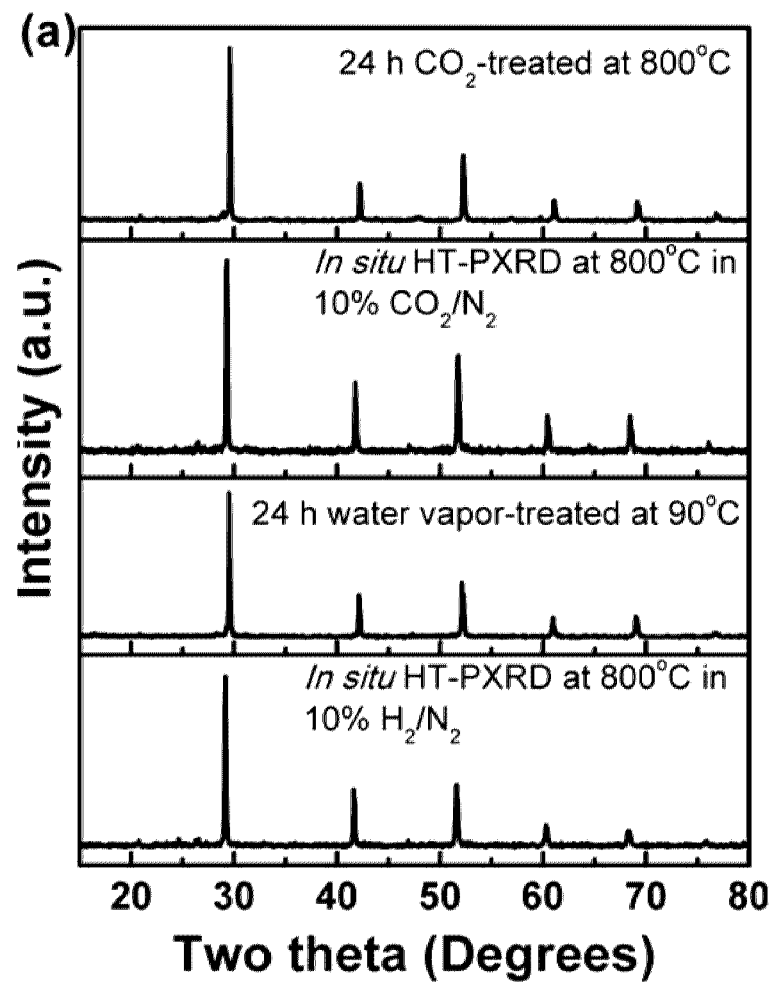
FIGS. 2A-E Comparison of chemical stability of $Ba_{0.5}Sr_{0.5}Ce_{0.6}Zr_{0.2}Y_{0.1}Gd_{0.1}O_{3-\delta}$ (Perovskite I) under various conditions. (A) PXRD pattern of Perovskite I after exposure to $CO_2$ at 800° C. and $H_2O$ vapor at 90° C. along with in situ high temperature PXRD patterns obtained under 10% $CO_2/N_2$ and 10% $H_2/N_2$ at 800° C. reveal its chemical stability and (B) TGA curve obtained for Perovskite I under air, $CO_2$ and dry $H_2$ all resemble each other closely indicating no significant change in the chemical composition. TGA of $H_2O$ vapor-treated sample shows a drop in weight from temperatures as low as 100° C. suggesting the incorporation of $H_2O$ in the crystal lattice.

The invention provides mixed metal oxide and metal composites thereof for use as solid electrolytes and anodes in SOFC, as well as additional mixed metal oxide materials for use as cathodes in SOFC.

In a specific embodiment, the invention provides metal oxides of formula I: $Ba_{1-x}Sr_xCe_{1-y1-y2-y3}Zr_{y1}Gd_{y2}Y_{y3}O_{3-\delta}$ where x, y1, y2, and y3 are numbers as follows:
x is 0.4 to 0.6;
y1 is 0.1-0.5;
y2 is 0.05 to 0.15
y3 is 0.05 to 0.15, where all ranges are inclusive, and
δ is a number that varies such that the metal oxide composition is charge neutral.

Where ranges of variable numbers are given, the ranges are inclusive.

In more specific embodiments, y1 is 0.1 to 0.3. In other embodiments, y1 is 0.1 to 0.3, y2=y3 and x is 0.4 to 0.6. In other embodiments, y1 is 0.1 to 0.3, y2=y3=0.09 to 0.11 and x is 0.45 to 0.55. In other embodiments, y 1 is 0.1 to 0.3, y2=y1=0.1 and x is 0.4 to 0.6.

In more specific embodiments, y2=y3. In other embodiments, y2=y3=0.09 to 0.11. In specific embodiments, y2=y3=0.1. In more specific embodiments, y1 is 0.18 to 0.22. In other embodiments, y 1 is 0.2. In more specific embodiments, x is 0.45 to 0.55. In other specific embodiments, x is 0.5.

In more specific embodiments, y2=y3 and y1 is 0.18 to 0.22. In other embodiments, y2=y3, y1 is 0.18 to 0.22 and x is 0.4 to 0.6.

In more specific embodiments, y2=y3=0.09 to 0.11 and y1 is 0.18 to 0.22. In other embodiments, y2=y3=m0.09n to 0.11, y1 is 0.18 to 0.22 and x is 0.4 to 0.6

In more specific embodiments, y2=y3 and y1 is 0.18 to 0.22. In other embodiments, y2=y3, y1 is 0.18 to 0.22 and x is 0.45 to 0.55.

In more specific embodiments, y2=y3=0.09 to 0.11 and y1 is 0.18 to 0.22. In other embodiments, y2=y3=0.09 to 0.11, y1 is 0.18 to 0.22 and x is 0.45 to 0.55.

In more specific examples, x is 0.4 to 0.6, y1 is 0.27 to 0.33, and y2=y3=0.09 to 0.11.

In more specific examples, x is 0.4 to 0.6, y1 is 0.36 to 0.44, and y2=y3=0.09 to 0.11.

In more specific examples, x is 0.4 to 0.6, y1 is 0.09 to 0.11, and y2=y3=0.09 to 0.11.

In more specific embodiments, y1+y2+y3 is 0.36 to 0.44. In other specific embodiments, y1+y2+y3 is 0.5 or less. In other specific embodiments, y1+y2+y3 is 0.4 or less. In other specific examples, y1+y2+y3 is 0.3 or less. In other specific embodiments, y1+y 2+y3 is 0.3 to 0.4. In specific embodiments, y2=y3 and y1+y2+y3 is 0.3 to 0.4. In more specific embodiments, y1+y2+y3 is 0.36 to 0.44 and y1 is 0.18 to 0.22. In more specific embodiments, y1+y2+y3 is 0.36 to 0.44, y1 is 0.18 to 0.22 and x is 0.4 to 0.6. In more specific embodiments, y1+y2+y3 is 0.36 to 0.44, y1 is 0.18 to 0.22 and x is 0.45 to 0.55.

In more specific embodiments, y1 is 0.18 to 0.33. In other embodiments, y1 is 0.18 to 0.33, y1 is 0.05 to 0.15 and y2 is 0.05 to 0.15. In other embodiments, y1 is 0.18 to 0.33, y1 is 0.05 to 0.15, y2 is 0.05 to 0.15, and x is 0.4 to 0.6. In other embodiments, y1 is 0.18 to 0.33, y1 is 0.05 to 0.15, y2 is 0.05 to 0.15 and x is 0.45 to 0.55. In other embodiments, y1 is 0.18 to 0.33, y1 is 0.05 to 0.11 and y2 is 0.05 to 0.11. In other embodiments, y1 is 0.18 to 0.33, y1 is 0.05 to 0.11, y2 is 0.05 to 0.11 and x is 0.4 to 0.6. In other embodiments, y1 is 0.18 to 0.33, y1 is 0.05 to 0.11, y2 is 0.05 to 0.11 and x is 0.45 to 0.55.

In specific embodiments, the invention provides compositions designated herein as Perovskite 1, BSCZGY2, BSCZGY3 and BSCZGY6.

In specific embodiments, compositions of formula I have a perovskite-type phase. In specific embodiments, compositions of formula I are single phase as assessed by PXRD method, i.e., having less than 3%-5% by weight of a phase other than a perovskite-type phase. In specific embodiments, compositions of formula I have less than 10% by weight of a phase other than a perovskite-type phase.

In specific embodiments, the proton-conducting metal oxide of formula I is employed to prepare a dense, non-gas-permeable, proton-conducting, solid electrolyte for a proton-conducting SOFC. In a specific embodiment, powders of the metal oxide of formula I are pressed into a desired shape (plate, disc, tube) having a desired thickness and sintered until dense. Preferably, the electrolyte has a density after sintering of equal to or greater than 95%.

The invention also provides composites of a metal with a proton-conducting metal oxide composition of formula I. In specific embodiments, the metal is Ni, Cu, Ag, Au or mixtures thereof. In specific embodiments, the metal is Ni or mixtures of Ni with one or more of Cu, Ag or Au. In a specific embodiment, the metal is an alloy of Ni with Cu. In specific embodiments, the metal is a mixture of Ni with Cu. In specific embodiments, the metal is Ni. The volume ratio of total metal to metal oxide of formula I in the composite ranges from 30:70 to 70:30. In specific embodiments, the volume ratio of metal to metal oxide of formula I ranges from 40:60 to 60:40. In specific embodiments, the volume ratio of metal to metal oxide ranges from 45:55 to 55:45. In a specific embodiment, the volume ratio of metal to metal oxide is 50:50. In specific embodiments, the volume ratio of metal to metal oxide ranges from 40:50 to 50:50. In specific embodiments, the metal is Ni. In specific embodiments, the metal oxide of formula I is Perovskite I, BSCZGY2, BSCZGY3 or BSCZGY6.

The metal/metal oxide composites are useful as anode materials for proton conducting SOFC. In such anode applications, the metal/metal oxide composite is formed into a porous layer allowing passage of gases in an SOFC. Porous metal/metal oxide layers can be formed by initial preparation of a precursor composite of oxide(s) of the metal of the composition and the composition of formula I, followed by reduction of the oxide(s) of the metal (Ni, Cu, Ag, Au or mixtures thereof, or a Ni/Cu alloy) in the precursor composite. Reduction of the oxide(s) of the metal in layers formed from the precursor provide for pore formation in the resulting metal/metal oxide composite.

Thus, the invention also provides precursor metal oxide mixtures of (1) a reducible metal oxide of one or more of Ni, Cu, Ag or Au, preferably Ni and/or Cu, including for example alloys of Ni with Cu, and more preferably Ni; and (2) a proton-conducting metal oxide of formula I. In these precursors, the volume ratio of the metal of metal oxide (1) and the proton-conducting metal oxide of formula I ranges from 30:70 to 70:30. In specific embodiments, the volume ratio of metal of metal oxide (1) to metal oxide of formula I ranges from 40:60 to 60:40. In specific embodiments, the volume ratio of metal of metal oxide (1) to metal oxide ranges from 45:55 to 55:45. In a specific embodiment, the volume ratio of metal of metal oxide (1) to metal oxide is 50:50. In specific embodiments, the volume ratio of metal of the reducible metal oxide to the metal oxide of formula I ranges from 40:50 to 50:50.

The invention provides a proton-conducting SOFC cell employing one or more proton-conducting metal oxides of formula I as the solid electrolyte and/or as a component of the anode. In specific embodiments, the proton-conducting metal oxide of the anode material and that of the electrolyte are the same. In other embodiments, the proton-conducting metal oxide of the anode material and that of the electrolyte are different. For example, SOFC cells of the invention may combine a solid electrolyte that is a proton-conducting metal oxide of formula I with an anode comprising an art-recognized proton-conducting metal oxide other than one of formula I.

Analogously, a proton-conducting SOFC of the invention may combine a proton-conducting solid electrolyte that is not metal oxide of formula I with an anode comprising a proton-conducting metal oxide of formula I. Examples of proton-conducting metal oxides other than those of formula I are known in the art and are described in this specification and in references cites herein.

In another aspect, the invention provides certain cathode materials for use in SOFC. In an embodiment, the cathode materials of formula II are employed in combination with the solid electrolyte of the invention which is a proton-conducting metal oxide of formula I. In an embodiment, the cathode materials of formula II are employed in combination with an anode which comprises a proton-conducting metal oxide of formula I. In another embodiment, the cathode materials of formula II are employed in combination with a solid electrolyte of the invention which is a proton-conducting metal oxide of formula I and an anode which comprises proton-conducting metal oxide of formula I.

In specific embodiments, the metal of the composite of the anode is Ni, Cu, Ag, Au or mixtures thereof. In specific embodiments, the metal is nickel. In other embodiments, the metal is a mixture of Ni with one or more of Cu, Ag, or Au. In other embodiments, the metal is a mixture of Ni with Cu. In other embodiments, the metal is an alloy of Ni and Cu.

In other embodiments, the cathode materials are employed with proton-conducting solid electrolytes other than those of formula I. In yet other embodiments, the cathode materials are employed with anodes comprising proton-conducting metal oxide other than those of formula I. As noted above, proton-conducting metal oxides other than those of formula I are known in the art and examples thereof are described in the specification and in references cited herein.

In specific embodiments in SOFC of the invention, cathode materials comprise a metal oxide of formula II or a mixture of such metal oxides. In specific embodiments the metal oxide of formula II has a perovskite-type phase. In specific embodiments, the metal oxide of formula II has a cubic perovskite phase. In specific embodiments, the metal oxide of formula II has an orthorhombic perovskite phase. In specific embodiments in SOFC of the invention, the anode comprises a metal oxide of formula I or a mixture of such oxides. In specific embodiments in SOFC of the invention, the anode comprises a metal oxide of formula I or a mixture of such oxides and a metal selected from Ni, Cu, Ag, Au or mixtures thereof. In specific embodiments in SOFC of the invention, the anode comprises a metal oxide of formula I or a mixture of such oxides and a metal selected from Ni, a mixture of Ni and Cu, a mixture of Ni and Ag and/or Au, or an alloy of Ni and Cu. In specific embodiments the metal oxide of formula I has a perovskite-type phase. In specific embodiments, in SOFC of the invention, solid electrolyte comprises a metal oxide of formula I. In specific embodiments the metal oxide of formula I that is used in the solid electrolyte has a perovskite-type phase.

Useful cathode materials of this invention are mixed metal oxides of formula II:

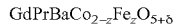

$GdPrBaCo_{2-z}Fe_zO_{5+\delta}$ where z is a number from 0 to 1, and δ is a number that varies such that the metal oxide composition is charge neutral, and where ranges of values for variables are inclusive.

In specific embodiments, z is 0. In other embodiments, z is 1. In other embodiments, z is 0.1 to 0.9. In other embodiments, z is 0 to 0.5. In other embodiments, z is 0.1 to 0.5. In other embodiments, z is 0.05 to 0.5

In specific embodiments, compositions of formula II have a perovskite-type phase. In specific embodiments, compositions of formula II are single phase as assessed by PXRD method, i.e., having less than 3-5% by weight of a phase other than a perovskite-type phase. In specific embodiments, compositions of formula II have less than 10% by weight of a phase other than a perovskite-type phase.

Various listed embodiments of anode material can be used in combination with various listed embodiments of cathode material in SOFC. Various listed embodiments of anode material can be used in combination with various listed embodiments of solid-electrolyte in SOFC. Various listed embodiments of anode material can be used in combination with various listed embodiments of solid electrolyte in SOFC. Various listed embodiments of anode material can be used in combination with various listed embodiments of solid electrolyte and in further combination with various listed embodiments of cathode material in SOFC.

In specific embodiments, the cathode comprises $GdPrBaCo_2O_{5+\delta}$. In specific embodiments, the cathode comprises $GdPrBaCoFeO_{5+\delta}$. In specific embodiments, the cathode consists essentially of a metal oxide of formula II. In specific embodiments, the cathode consists essentially of $GdPrBaCo_2O_{5+\delta}$. In specific embodiments, the cathode consists essentially of $GdPrBaCoFeO_{5+\delta}$.

Perovskite I of the nominal formula $Ba_{0.5}Sr_{0.5}Ce_{0.6}Zr_{0.2}Gd_{0.1}Y_{0.1}O_{3-\delta}$ was prepared by a solid-state (ceramic) method at 1450° C. for 24 h. FIG. 1A shows the powder X-ray diffraction (PXRD) pattern of the as-prepared sample. FIGS. 1B-1D show the TEM, HRTEM and selected area electron diffraction (SAED) patterns of Perovskite I, respectively. The crystallite size obtained from TEM image was found to be in the range of 200 nm. Further, crystallite sizes are narrowly distributed and are highly crystalline as seen from the ring intensities in SAED [18]. The SEM image obtained on the polished pellet reveals the highly dense nature of the Perovskite I pellet and grains in the 2-5 micron range as shown in FIG. 1E.

Figure 2B:
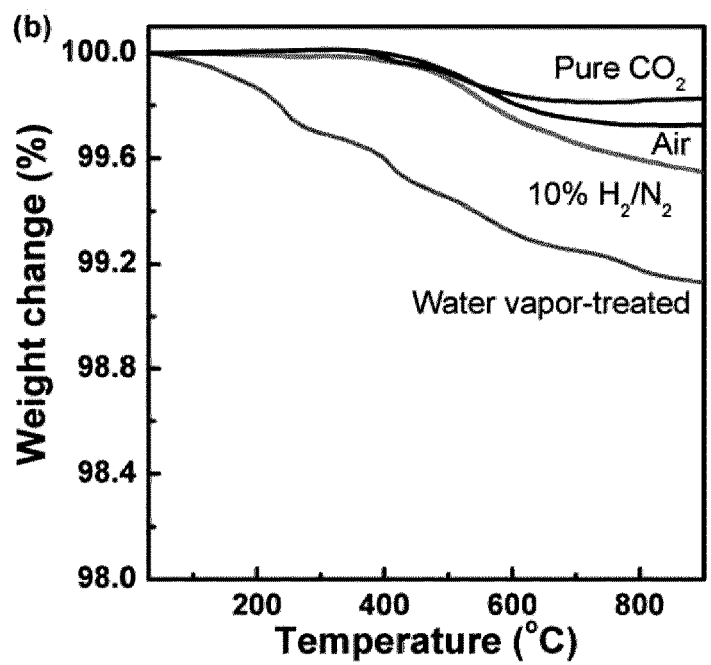
Figure 6:
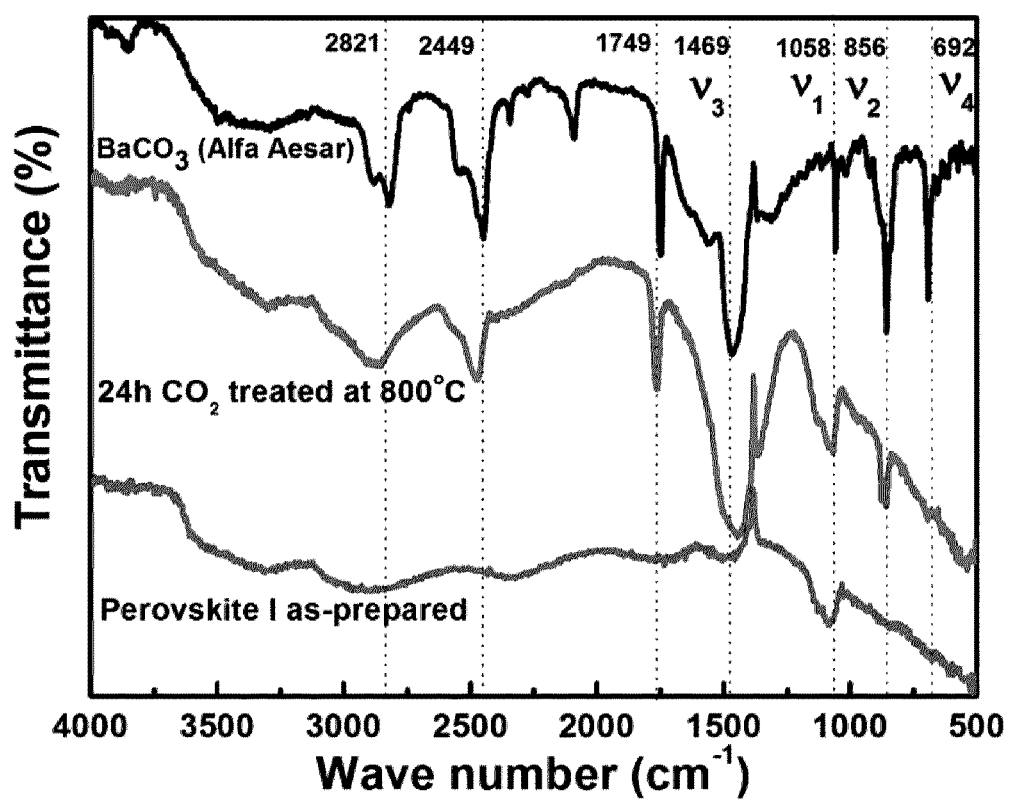
FIG. 6 illustrates FT-IR spectra obtained for $BaCO_3$, as-prepared Perovskite I and Perovskite I after exposure to pure $CO_2$ at 800° C. for 24 h. The FT-IR peaks at 1058 ($v_1$), 856 ($v_2$), and 692 cm$^{-1}$ ($v_4$) are assigned to symmetric stretching, asymmetric deformation and symmetric deformation modes of the carbonate anion, respectively. The peak at 1469 cm$^{-1}$ ($v_3$) is assigned to asymmetric stretching and the peaks at 2449, 1749 cm$^{-1}$ are assigned to surface contamination of $BaCO_3$.
Figure 7:
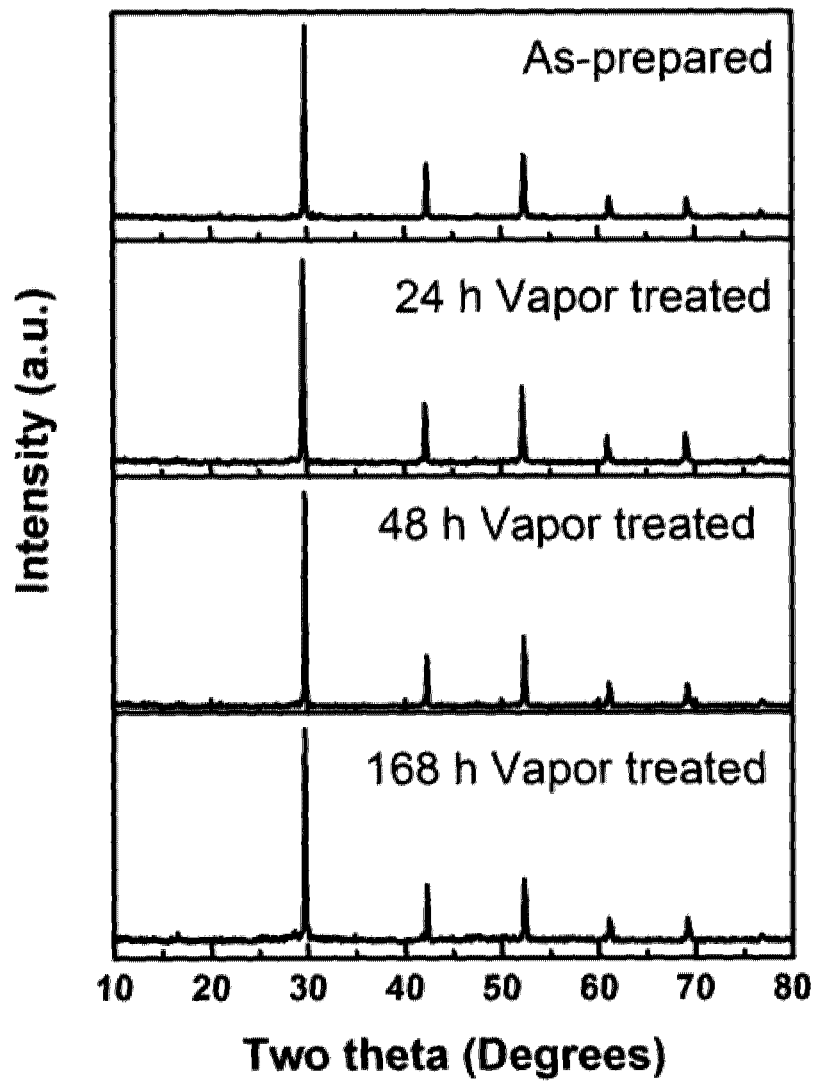
FIG. 7 illustrates the PXRD patterns obtained for Perovskite I after $H_2O$ vapor treatment for various durations at 90° C.
Figure 8:
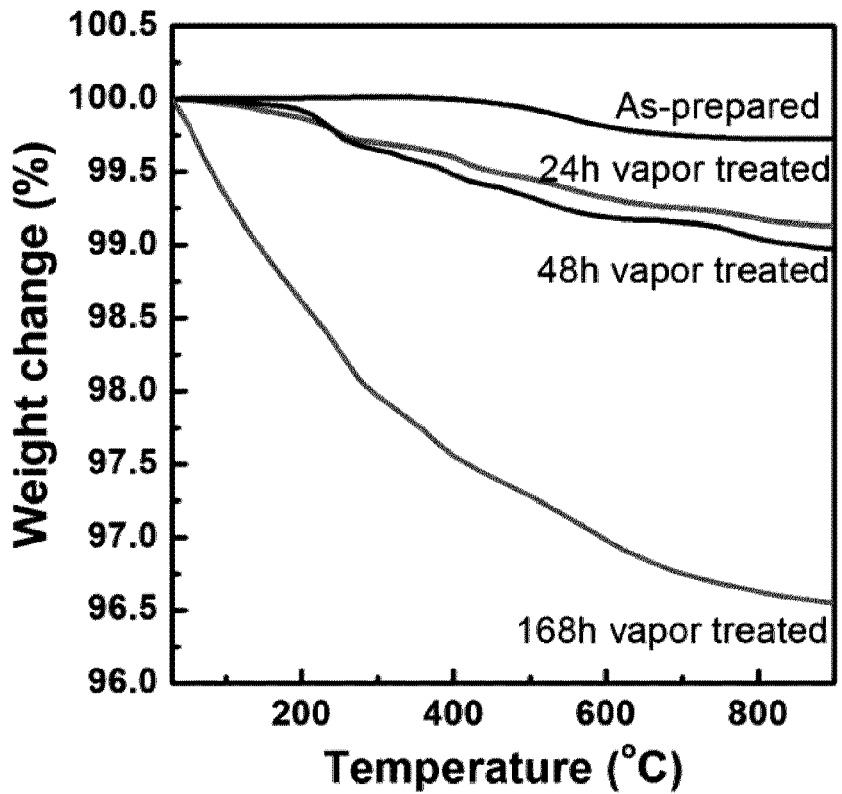
FIG. 8 illustrates TGA plots obtained for Perovskite I after $H_2O$ vapor treatment for various durations at 90° C.

FIGS. 2A and 2B show the results of PXRD and TGA measurements in various stability studies, respectively. FT-IR measurements on Perovskite I before and after $CO_2$ treatment at 800° C. are shown in FIG. 6. The PXRD pattern in FIG. 2A after 24 h water vapor treatment of Perovskite I does not show any additional peaks corresponding to the formation of $Ba(OH)_2$. When the treatment time was extended to 48 and 168 h, no major change was observed in the PXRD pattern, indicating significant chemical stability in the presence of water vapor (see FIG. 7). TGA curves obtained on these samples suggest a maximum weight loss of <1% up to 900° C. after 24 h. However, exposure to water vapor for extended periods (for 48 and 168 h) show a steady increase in weight loss with exposure time (FIG. 8). Despite the increased water uptake, PXRD do not reveal any additional peaks other than the perovskite-phase lines. FT-IR study on Perovskite I before and after water vapor treatment studies show only a minor peak at 855 $cm^{-1}$ which could be due to Ba—O bond vibrational modes (see supplementary FIG. 9)

The ratio between the PXRD diffraction intensities of $(I_{110}/I_{200})$, $(I_{110}/I_{211})$ and $(I_{211}/I_{200})$ remains constant after various stability measurements, further confirming the structural integrity of Perovskite I (see Table 2). An additional indication of Perovskite I chemical stability is its appearance before and after exposure to $CO_2$ and $H_2O$ vapor as it retains its green color despite the harsh chemical stability tests (see FIGS. 10A-C).

To understand the role of $CO_2$ partial pressure on chemical stability, a mixture of $CO_2$ and $N_2$ (1:1 vol. ratio) with 30% humidification for 140 h at 600° C. was passed in contact with Perovskite I. The PXRD pattern of Perovskite I after this treatment does not reveal any additional diffraction peaks corresponding to $BaCO_3$ or $Ba(OH)_2$ formation (see FIG. 11).

Figure 3A:
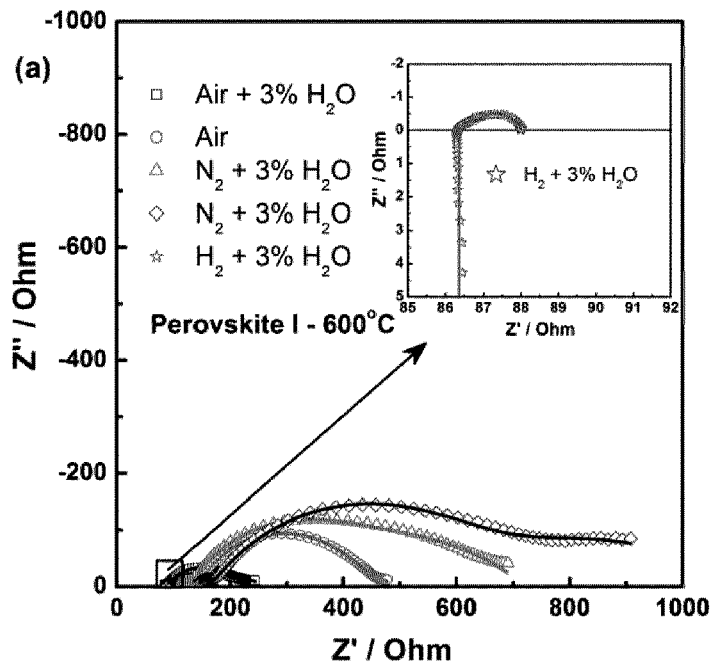
FIGS. 3A-C illustrate conductivity measurements of compositions of the invention.

AC impedance plots obtained for Perovskite I under different environments at 600° C. are given in FIG. 3A, along with the fitting results. Equivalent circuits used for fitting is given in FIGS. 12A and B and verification of the fitting results were done by Kramers and Kronig (KK) analysis (see FIGS. 13A and B) [20, 21].

Figure 3B:
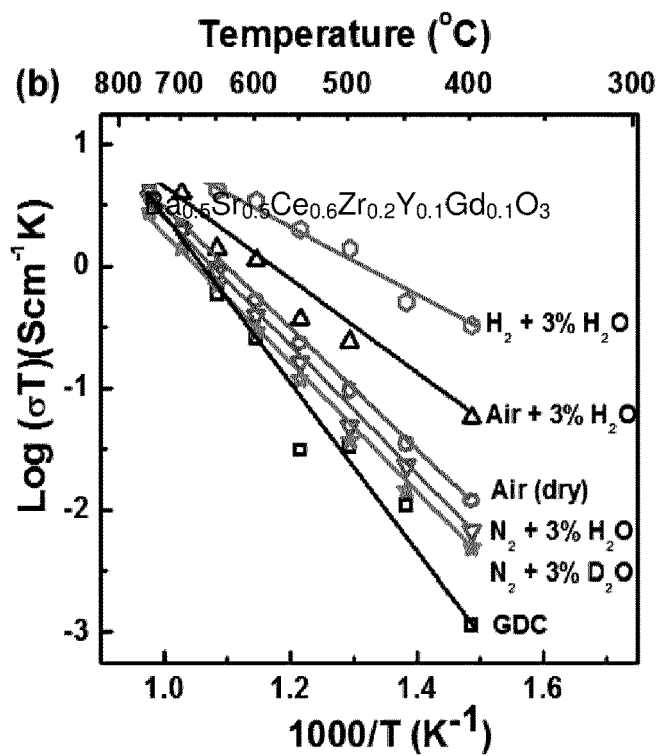
Figure 4A:
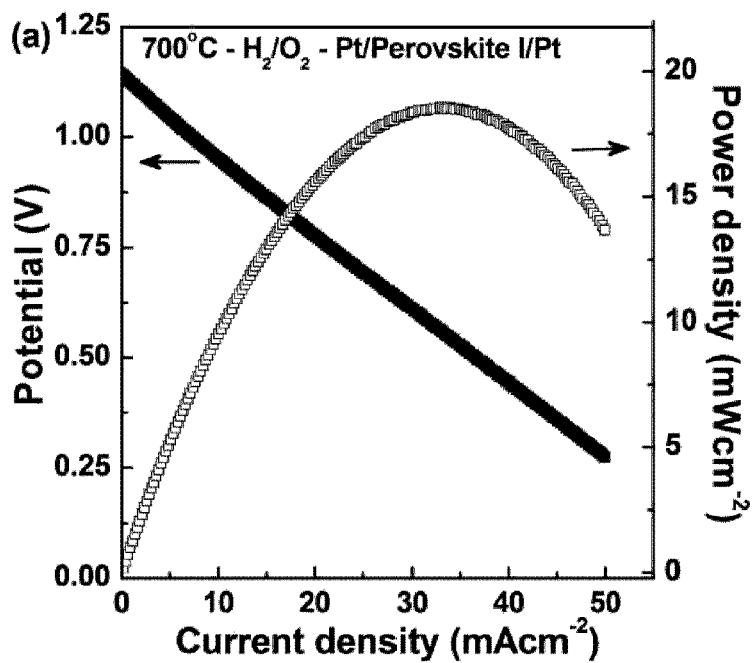
FIGS. 4A-B illustrate polarization studies on $Ba_{0.5}Sr_{0.5}Ce_{0.6}Zr_{0.2}Gd_{0.1}Y_{0.1}O_{3-\delta}$ (Perovskite I). (A) Fuel cell polarization plot obtained using Pt paste as the cathode and anode and Perovskite I as electrolyte under humidified $H_2$ and dry $O_2$ as the fuel and oxidant at 700° C. and (B) Impedance Nyquist plot obtained for this cell under above mentioned conditions in the frequency range of 1 MHz to 0.1 Hz. The high resistance observed in the Nyquist plot is due to thicker electrolyte (~3 mm).
Figure 4B:
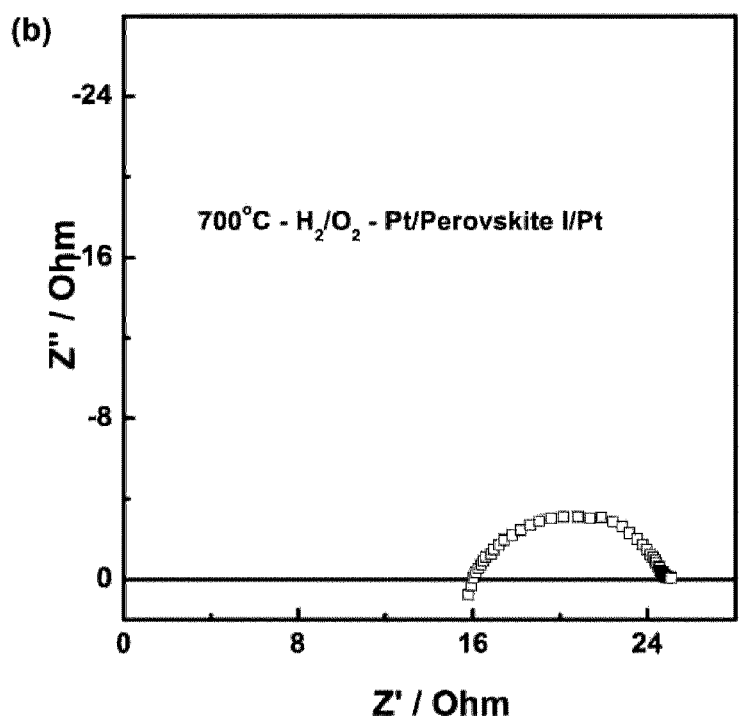

Further, the calculated capacitance values from equivalent series fitting showed the presence of grain-boundary and bulk contributions at low temperatures, while at higher temperatures the grain-boundary effects disappear as observed from the removal of semi-circle corresponding to capacitance 1028 F (see Table 3). Arrhenius plots for Perovskite I and Gd-doped $CeO_2$ (GDC) (one of the commercial IT-SOFC electrolytes) are shown in FIG. 3B. The activation energy obtained under wet hydrogen atmosphere for Perovskite I is 55 kJmol [21] significantly lower than the 94 kJmol [21] obtained under air, confirming its proton conducting nature under wet hydrogen. Fuel cell polarization (hydrogen-air cell) plots obtained with Perovskite I as an electrolyte and Pt electrodes by passing humidified hydrogen and air are given in FIG. 4A. The open circuit potential (OCP) observed at 700° C. was found to be 1.15 V which is close to the Nernst potential for water formation.

The PXRD study of Perovskite I (FIG. 1A) suggests the formation of a single-phase perovskite-type structure in space group Pm3m (no.: 221) with a lattice constant (a) of 4.282(3) Å. The FFT analysis of the HRTEM image of Perovskite I further indicates the formation of cubic crystal lattice (See supplementary FIG. 14). This significantly lower lattice constant in comparison with other rare earths and Zr co-doped BCs could be attributed to the incorporation of smaller Sr (118 pm) for Ba (135 pm). For example, Gd, Pr, Sm and Zr-codoped BCs showed lattice constants in the range of 4.387-4.330 A° [22, 23]. The d-spacing obtained from the PXRD measurements match well with that of values obtained from SAED pattern (FIG. 1D)[18]. The density of the pellets of Perovskite I was found to be about 95% as measured by Archimedes' method. In comparison, Y-doped $BaZr_{0.85}Y_{0.15}O_{3-\delta}$ prepared by the solid state method was reported to have a density in the range of 75-80% and hot pressing was required to obtain densities greater than 95% [9, 24], which make BZY unsuitable for scalable SOFCs [25].

Ex-situ PXRD pattern (FIG. 2) obtained after exposure to pure $CO_2$ at 800° C. for 24 h reveals that Perovskite I retains the as-prepared perovskite-type structure with no additional peaks. Similarly, the high temperature in-situ PXRD pattern obtained under 10% $CO_2/N_2$ does not show any second phase, confirming that Perovskite I remains stable against chemical reaction to $CO_2$. The TGA curve obtained under pure $CO_2$ resembles that of the TGA curve obtained in air, further supporting in-situ and ex-situ PXRD studies that Perovskite I does not react with $CO_2$ over the whole temperature range despite favorable thermodynamic conditions. However, FT-IR measurements showed a very minor peak due to carbonate.

The free energy of $BaCO_3$ formation as a function of $CO_2$ for $BaCe_{1-x}Zr_xO_3$ suggests that about 70 mol % of Zr doping is needed to eliminate the formation of the carbonate at 800° C. [5]. We consider that doping of comparatively higher electronegative elements in both the A and B sites of BCs have increased their resistance toward the acidic $CO_2$ and reduced the kinetics of $BaCO_3$ formation significantly.

While proton conducting SOFCs may operate normally on external reformed hydrogen that produces lower $CO_2$ partial pressures, stability measurements herein were carried out under extreme conditions to prove the superior stability of Perovskite I (FIG. 2). Similar studies on YBCs reported the formation of carbonates at 500° C. under $CO_2$ exposure as low as 2% [26]. It is important to mention that the in these reported studies flow rate of gases and the final sintering temperature of the investigated perovskite appeared to be crucial for the observed chemical stability under $CO_2$.

The Gibbs free energy for the reaction between BCs and $H_2O$ vapor reaches the value of zero at 403° C. and accordingly aliovalent doped BCs are reported to be stable at elevated temperatures (greater than 500° C.) under water vapor, while stability at low temperatures remained unachievable [27, 28]. Recent work on Sm and Gd+Pr codoped with Zr in BCs could not achieve chemical stability under water vapor at 90° C. even after 30% Zr-substitution for Ce [22, 23]. But in the case of Perovskite I, water vapor stability was achieved even at the low temperature of 90° C. for an extended duration (FIGS. 2A and B and FIGS. 7 and 8). For Perovskite I exposed to water vapor for 168 h, the TGA showed an increase in weight loss, when compared to samples exposed for 24 h and 48 h water vapor exposed (FIG. 8).

Acceptor-doping in barium cerates can generate oxide ion vacancy according to the substitution mechanism:

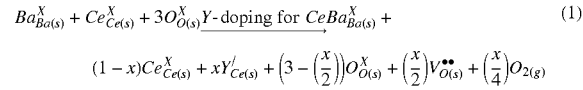

$$(1-x)Ce_{Ce(s)}^X + xY_{Ce(s)}^{\prime} + \left(3-\left(\frac{x}{2}\right)\right)O_{O(s)}^X + \left(\frac{x}{2}\right)V_{O(s)}^{\bullet\bullet} + \left(\frac{x}{4}\right)O_{2(g)}$$

where every 1 mole of $M^{3+}$ doping creates 0.5 moles of oxygen vacancies. On complete filling of these vacancies by $H_2O$, TGA will result in a weight loss of ~0.6%. However, 168 h exposure to $H_2O$ vapor at 90° C. resulted in weight loss of 3.5% which suggests excess water may be adsorbed at surfaces or possibly at the grain-boundaries. SEM images of powdered samples after 168 h exposure are shown in FIGS. 15A-D.

A similar study on $BaCe_{0.84}Zr_{0.01}Sm_{0.15}O_{3-\delta}$ exposure to $H_2O$ for 24 h resulted in a weight loss of greater than 8% and the formation of peaks corresponding to $Ba(OH)_2$ (FIG. 16) [22]. Also Sm-doped BCs exposed to $H_2O$ for 24 h showed complete decomposition of the powders into amorphous materials by PXRD [22].

Thus, the increased water uptake upon extended exposure is believed due to incorporation of water molecules in the vacancies and adsorption rather than the formation of $Ba(OH)_2$, which is consistent with the PXRD measurements. The diffusivity of water in doped perovskites is reported to be slow at low temperature, which could be the reason for only a slight increase in weight due to water uptake at 168 h compared to 24 h and 48 h (FIG. 8) [29, 30].

Chemical stability under $H_2$ at elevated temperature is another significant factor to be considered for these materials, as Ce based electrolyte materials tend to react under this highly reducing condition and result in lower cell potentials. HT-PXRD under 10% $H_2/N_2$ at 800° C. shows that Perovskite I retains the as-prepared perovskite structure, indicating that the compositions of this invention will have utility as electrolytes.

Similarly, TGA curves under pure $H_2$ reveal no significant weight loss and further demonstrate the structural stability of Perovskite I under reducing conditions. Nevertheless, 0.13% weight loss in excess is observed for TGA in $H_2$ in comparison to that obtained in air at 800° C. which would correspond to ~4.5% conversion of $Ce^{4+}$ to $Ce^{3+}$. However, at the operating temperature of proton conducting SOFCs typically at 600° C., this conversion will be less than 2%. (see examples for the calculation). Thus, based on the above results, Perovskite I is highly stable under SOFC operating conditions, which is critical for its successful operation.

Perovskite 1 shows the highest conductivity under $H_2+3\%$ $H_2O$ (FIGS. 3A and 3B), and the lowest under $N_2+3\%$ $D_2O$ among investigated environments. In air, the conductivity is significantly higher under wet rather than dry air suggesting proton conduction under wet conditions. Proton conductivity in doped BCs arises from the filling up of hydroxyl ions in the oxide vacancies (VO):

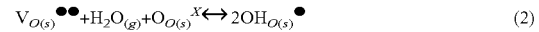

At low temperatures, the conductivity is dominated by proton transport due to higher $H_2O$ uptake. However, as indicated by TGA curves at high temperatures, the protons leave the lattice thereby reducing the concentration of hydroxyl protons and contribution from oxide ion increases. Comparison of the conductivity of Perovskite I to that of oxide ion conducting Gd-doped $CeO_2$ (GDC) made from commercially available powder (GDC 10 TC grade, fuelcellmaterials.com, NexTech Materials, Lewis Center, Ohio) show two orders of magnitude increased conductivity at low temperatures. Nevertheless, GDC is reported to show a higher conductivity value in the literature [11], where a maximum ionic conductivity of $0.4 \times 10^{-2}$ $Scm^{-1}$ is reported at 600° C. for Perovskite I, where our prepared GDC showed a conductivity of $0.3 \times 10^{-3}$ $Scm^{-1}$ under similar experimental conditions. $BaZr_{0.8}Y_{0.2}O_{3-\delta}$ showed a conductivity of $7.9 \times 10^{-3}$ $Scm^{-1}$ at this temperature after hot pressing to ensure densification [24]. A comparison between the reported conductivity values of state of the art YSZ and Perovskite I also show the superior conductivity at desired fuel cell operating temperature of below 700° C. [11]. At higher temperatures, the difference in conductivity obtained for Perovskite I between wet $H_2$ and other atmosphere is diminished and could be attributed to proton dissolution from the crystal matrix at elevated temperatures [29]. An increased activation energy of 77 $kJmol^{-1}$ observed in 3% humidified air against the 55 $kJmol^{-1}$ under wet hydrogen suggests possible mixed (protons and oxide ions) ionic conductivity. Similar studies on acceptor-doped orthoniobates showed that at temperatures higher than 700° C., contribution of protons towards total conductivity decreased as observed by the decrease in proton transport numbers [31].

The open circuit potential (OCP) observed at 700° C. was found to be 1.15 V, which clearly reveals the highly dense nature of the membrane. Furthermore, it also confirms that the Perovskite I is a pure ionic conductor. Conductivity in Perovskite I is entirely due to ions and not due to electrons ($e^-$) or holes ($h^\bullet$).

The contribution of different ions towards the conductivity in electrolytes can be shown with the help of ion transport numbers. For a given material the ion transport numbers vary dependent upon temperature and the atmosphere. The degree of proton conductivity is determined by the proton transport number. A proton transport number of 1 means that all conductivity is due to proton transfer. For example, $BaCe_{0.9}Y_{0.1}O_3$ is reported to have a proton transport number of 1 below 550° C. and $BaCe_{0.8}Gd_{0.1}O_{3-\delta}$ is reported to have a proton transport number close to 1 at 600° C. [32, 32]. In these materials, as the temperature is increased, proton transport number decreases, indicating that oxide ion conductivity is increasing [32-35]. Thus, based on literature reports, Perovskite 1 would be expected to exhibit mixed ionic conductivity above 600° C.

Proton transport number studies on other perovskites demonstrated pure proton conduction up to 700° C. under wet conditions [11, 31] Further, the small amount of $Ce^{4+}/Ce^{3+}$ conversion observed under TGA does not induce significant electronic conductivity as otherwise the OCP would have been reduced due to electronic short circuiting. A maximum power density of 18 $mWcm^{-2}$ is achieved at 700° C. for un-optimized thick Perovskite I electrolyte with the use of Pt paste as electrodes. The Nyquist plots obtained with Perovskite I in fuel cell mode by passing wet $H_2$ and air are consistent with the plots obtained in wet $H_2$ (FIG. 3). A maximum conductivity of about $1\times10^{-2}$ $Scm^{-1}$ is achieved at 700° C. under fuel cell operating conditions.

At least a portion of the details of the present invention are provided in R. Kannan, K. Singh, S. Gill, T. Fürstenhaupt and V. Thangadurai, *Sci. Report* 3, 2138 (2013). This reference is incorporated by reference herein in its entirety for its descriptions with respect to the synthesis and assessment of the properties of materials of this invention.

The proton-conducting metal oxides of formula I are useful for making solid proton-conducting electrolytes and/or anodes for proton-conducting solid oxide fuel cells. Zuo et al. 2012 provides a review of SOFC configurations including planar and tubular configurations and electrolyte-supported cells and anode-supported cells. Fabbri et al. 2010 [54] provides a review of proton-conducting SOFC and materials useful in such cells. This reference is incorporated by reference herein in its entirety for its descriptions of proton-conducting SOFC, electrolyte and electrodes useful therefore.

Figure 5:
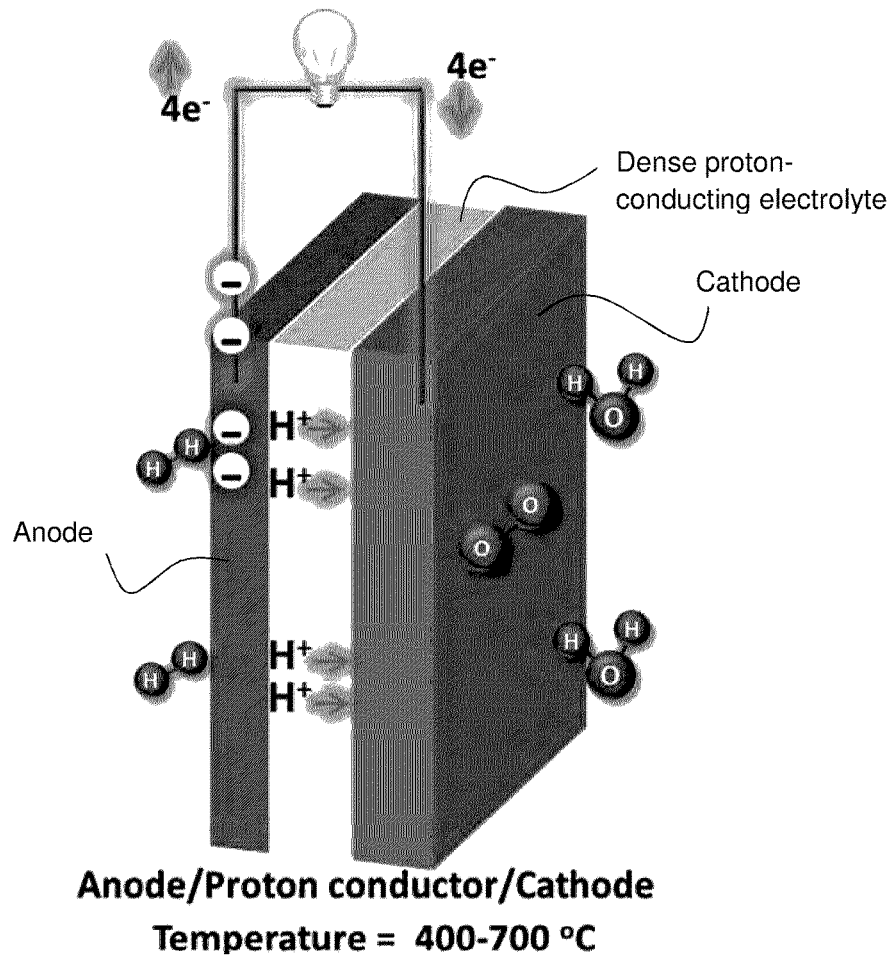
FIG. 5 is a schematic of an exemplary proton-conducting solid oxide fuel cell. The electrochemical reactions at the anode and cathode are provided as well as the overall reaction of oxygen and hydrogen to generate water with the generation of electrical energy in an external circuit. Current collectors (not specifically shown) are typically provided at the cathode and anode.

FIG. 5 illustrates a schematic of a proton-conducting SOFC. The cell has a dense gas-impermeable proton-conducting electrolyte between electrodes, a cathode and an anode. The electrodes are connected via an external circuit. Current collectors (not specifically shown) can be provided at each electrode. Both the anode and the cathode are porous. A fuel gas, typically a hydrogen-containing gas, is supplied in contact with the anode. An oxygen-containing gas, typically air, is supplied in contact with the cathode. Hydrogen is oxidized to protons at the anode. Protons are conducted through the electrolyte to the cathode. Electrons generated on oxidation of hydrogen are conducted to the cathode via an external circuit. Oxygen reacts with protons at the cathode to form water. The electrochemical reactions at the anode and cathode and the overall reaction are shown in FIG. 5.

FIG. 5 illustrates a planar SOFC configuration with cathode and anode in contact with opposite planar surfaces of an intervening dense electrolyte. Tubular SOFC configurations can also be employed where opposite electrodes are formed in contact with the inner and outer surfaces, respectively, of a tube formed of dense proton-conducting electrolyte. In this case, the fuel gas and the oxygen-containing gas are supplied to the inside or outside of the tubular cell to the appropriate electrode. In a specific embodiment, a proton-conducting SOFC is formed by forming a layer, plate or tube of proton-conducting electrolyte and coating an anode layer on one surface of the layer, plate or tube and coating a cathode layer on the opposite surface of the layer, plate or tube, the electrodes being separated from each other by the dense gas-impermeable solid electrolyte. Single SOFC may be electrically connected in series or parallel as desired. Single SOFC may be formed into bundles and arrays of bundles to form SOFC stacks. A single fuel gas source may be supplied to a plurality of SOFC. A single source of oxygen-containing gas may be supplied to a plurality of SOFC.

In the present invention, the dense gas-impermeable solid electrolyte is formed from a proton-conducting metal oxide of formula I. In a specific embodiment, the solid electrolyte is formed from Perovskite I. In a specific embodiment, the dense solid electrolyte is formed from powders of metal oxides of formula I which are pressed into a desired shape and thickness and then sintered to form dense solids. In specific embodiments, the shaped sintered solid electrolyte has density equal to or greater than 95%. As is known in the art, dense gas-impermeable proton-conducting electrolytes can be formed by hot pressing methods. The use of hot pressing methods is however not preferred because of difficulties in scale-up.

Any porous anode layer which functions for oxidation of hydrogen to protons can be used in SOFC of this invention in which the solid electrolyte is formed from a proton-conducting metal oxide of formula I. A number of generally suitable anode materials are known in the art. Materials which show mixed electronic and proton conductivity and show good catalytic activity towards hydrogen oxidation can be employed as anodes [43]. An example of an anode material, other than a metal oxide of formula I, is $Cu$—$CeO_2$ anode has been employed as anode for SOFC based on yttria-doped zirconia electrolyte (YSZ) [42].

In a specific embodiment, the invention provides proton-conducting SOFC in which the anode comprises a metal oxide of formula I. More specifically, the anode is formed from a composite of a metal and the metal oxide of formula I. The metal is a metal, metal alloy or a mixture of metals that exhibit some level of catalyst activity for oxidation of hydrogen into protons. In specific embodiments, the metal is Ni, Cu, Ag or Au or alloys or mixtures thereof. More specifically, the metal is Ni, an alloy of Ni and Cu or a mixture of Ni with one or more of Cu, Ag or Au. In a preferred embodiment, the metal is Ni. Ni is preferred because it exhibits excellent catalytic activity towards the oxidation of hydrogen.

In specific embodiments, the anode is formed by reduction of a precursor composite of a reducible metal oxide composite with the metal oxide of formula I. The reduction of the metal oxide can be done by exposing a shaped electrode or electrode layer formed from the precursor to a reducing atmosphere containing hydrogen at elevated temperature (e.g., SOFC operating temperatures 400-700° C.)

In a specific embodiment, a proton-conducting SOFC is formed by first forming a dense proton-conducting solid electrolyte that is 200-800 micron in thickness (preferably 400-600 microns). The electrolyte can be formed as a plate or as a tube if desired. An anode layer is provided by screen printing a slurry of the NiO-metal oxide composite of formula I on a surface of the electrolyte. Similarly, a cathode layer is provided by screen printing of a slurry of cathode material on the other surface of the electrolyte. The anode and cathode layers can range in thickness from 20 to 80 microns (preferably 30-40 microns). The screen printed electrolyte is fired at 1200° C. for 3 h at the rate of 2 degree per minute.

Any cathode material known in the art to be useful in proton-conducting SOFC cells can be used as the cathode material herein. In specific embodiments, the cathode material comprises an oxygen anion-conducting mixed metal oxide. $BaZr_{0.8-x}Pr_xY_{0.2}O_{3-\delta}$, $BaCe_{0.8-x}Pr_xY_{0.2}O_{3-\delta}$, and $Ba(Pr_{0.8}Gd_{0.2})O_{2.9}$, are useful for cathode application as they can exhibit mixed proton/electronic conductivity [47, 48, 49]. A review by Peng et. al also gives broad materials which can be employed as cathodes for current system [50]. Fabbri et al. 2010 [54] also provides description of electrodes (anodes and cathodes) for proton-conducting SOFC. Each reference cited in this paragraph is incorporated by reference herein in its entirety for descriptions of cathode materials.

In a specific embodiment, a proton-conducting SOFC is formed by first forming a dense solid electrolyte (in desired shape and of desired thickness) and then coating on one surface of the electrolyte a layer of a precursor composite of a reducible metal oxide (e.g., NiO) and the metal oxide of formula I. This layer will form the porous anode on at least partial reduction of the reducible metal oxide to metal of the precursor composite. A layer of cathode material is then provided on the opposite surface of the dense solid electrolyte. An external electrical circuit is provided between the anode and cathode which optionally comprises appropriate current collectors. Cu. Ag and Au may be used in SOFC cells as current collectors and can mitigate the effect of carbon coking while using hydrocarbon fuels [40-42].

The term reducible metal oxide is used herein to refer to the metal oxide in the precursor composite of the anode, such as NiO, which can be substantially reduced in the composite to its corresponding metal without significant detriment to proton-conduction or stability of the metal oxide of formula I in the composite. It will be appreciated that some level of the reducible metal oxide (e.g., NiO) may be retained in the anode without loss of anode function.

Anode and cathodes of the SOFC of this invention are porous. Porosity of 30-40% is preferred [32]. Porosity in anode and cathode layers can be introduced by reduction of certain metal oxides to metal (e.g., NiO to Ni) or by adding a pore forming agent, such as poly(methyl methacrylate (PMMA), corn starch, graphite or carbon black [36-39]. Pore formers, if employed, are typically added at 10-20% by volume in electrode precursor materials.

Proton-conducting SOFC can be prepared employing proton-conducting metal oxides of formula I as described in any of references 47, 49, 51 and 52, each of which is incorporated by reference herein in its entirety for description of such preparation.

The invention further provides a method for producing electrical energy from a proton conducting solid oxide fuel cell of the invention which comprises an anode comprising a proton-conducting metal oxide of formula I and/or a dense proton-conducting electrolyte comprising or consisting of a proton-conducting metal oxide of formula I. The method comprises contacting the anode of the cell with a fuel gas, i.e., a hydrogen-containing gas and contacting the cathode of the cell with an oxygen-containing gas, e.g., air. The electrolyte materials of this invention exhibit better stability with respect to water and $CO_2$ compared to art-known proton-conducting metal oxides. The in specific embodiments, the method of this invention is improved for use where gas feed streams, e.g., hydrogen-containing gas, contain water and $CO_2$.

The term perovskite refers herein to a class of inorganic compounds (including mixed metal oxides) that have the same type of crystal structure as $CaTiO_3$, the oxide mineral species called perovskite. A subset of perovskites are mixed metal oxides of general formula $ABO_3$, where A and B are different metals or mixtures of metals. Perovskites also include oxygen-deficient metal oxides of general formula $ABO_{3-\delta}$. A perovskite-type phase has crystal structure similar to $CaTiO_3$ and has general formula $ABO_3$ or ($ABO_{3-\delta}$), where A is a larger cation such as Ca, Sr and Ba; and B is smaller size cation such as Ce. In an ideal cubic symmetry, A is in 12-fold coordination and B is in 6-fold coordination with the O. In compositions of this invention, A=Ba and Sr, B=Ce, Zr, Y, Gd.

The Goldschmidt tolerance factor (t) is an indicator for the stability of crystal structures:

$$t = \frac{(r_A + r_B)}{\sqrt{2(r_B + r_O)}},$$

where $r_A$, $r_B$ and $r_O$ are the radii of ions.

A perovskite-type phase exists generally when t ranges between 0.75-1. The presence of a perovskite-type phase is assessed by comparing peaks in PXRD to the parent phase $BaCeO_3$. The PXRD of $BaCeO_3$ is available from the Joint Committee of Powder Diffraction Standards (JCPDS). When the peaks in PXRD of a given composition being tested match with the peaks in parent phase, the composition is said to have a perovskite type phase. It is understood in the art that the PXRD peak positions (2θ values) for a given perovskite-type phase can shift from the peak positions of the parent phase. Peak shifts in PXRD patterns are due to difference in ionic radius of dopants. For example with higher Zr content, the peaks are shifted to higher 2θ values, as $Zr^{4+}$ has smaller ionic radius than $Ce^{4+}$. The range for the shift will be dependent on the substitution of the dopants.

In this document including the representative claims, the singular forms "a", "an" and "the" include plural reference unless the context clearly dictates otherwise. All technical and scientific terms used herein have the same meaning as commonly understood to one of ordinary skill in the art to which this invention belongs, unless the term is specifically defined otherwise herein.

Each reference throughout this application, for example patent documents including issued or granted patents or equivalents; patent application publications; and non-patent literature documents or other source material; is hereby incorporated by reference herein in its entirety, as though individually incorporated by reference, to the extent each reference is at least partially not inconsistent with the disclosure in this application (for example, a reference that is partially inconsistent is incorporated by reference except for the partially inconsistent portion of the reference.)

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a composition is claimed, it should be understood that compositions known in the prior art, including certain compositions disclosed in the references disclosed herein (particularly in referenced patent documents), are not intended to be included in the claim.

In variable group definitions disclosed herein, it is understood that all individual members of those groups and all subgroups are disclosed separately. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

THE EXAMPLES

Example 1: Exemplary Preparation

A. Preparation of $Ba_{0.5}Sr_{0.5}Ce_{0.6}Zr_{0.2}Gd_{0.1}Y_{0.1}O_{3-\delta}$ (Perovskite I).

High purity (>99.9%) oxide and carbonate precursors, barium carbonate, strontium carbonate, cerium oxide, zirconium oxide, gadolinium oxide and yttrium oxide ($BaCO_3$, $SrCO_3$, $CeO_2$, $ZrO_2$, $Y_2O_3$, and $Gd_2O_3$ from Sigma Aldrich) were mixed in the appropriate ratio and ball milled (200 rpm) for 6 h using 2-propanol as the solvent. The mixture was than dried and calcined at 1050° C. for 24 h followed by further ball milling for 6 h. The as-prepared powders were uni-axially pressed into pellets using an isotactic press at 200 MPa for 3 minutes (~1 cm diameter and ~2 cm length) and sintered with their parent powders for 24 h at 1450° C.

B. The following additional compositions of A and B site co-doped proton conducting perovskites were synthesised using the above solid state synthesis method.

$Ba_{0.5}Sr_{0.5}Ce_{0.5}Zr_{0.5}O_{3-\delta}$ (BSCZGY1)
$Ba_{0.5}Sr_{0.5}Ce_{0.5}Zr_{0.3}Y_{0.1}Gd_{0.1}O_{3-\delta}$ (BSCZGY2)
$Ba_{0.5}Sr_{0.5}Ce_{0.4}Zr_{0.4}Y_{0.1}Gd_{0.1}O_{3-\delta}$ (BSCZGY3)
$Ba_{0.5}Sr_{0.5}Ce_{0.35}Zr_{0.4}Y_{0.1}Gd_{0.15}O_{3-\delta}$ (BSCZGY4)
$Ba_{0.5}Sr_{0.5}Ce_{0.7}Zr_{0.1}Y_{0.1}Gd_{0.1}O_{3-\delta}$ (BSCZGY6)
$Ba_{0.5}Sr_{0.5}Ce_{0.8}Y_{0.1}Gd_{0.1}O_{3-\delta}$ (BSCZGY7)
$Ba_{0.5}Sr_{0.5}Ce_{0.7}Zr_{0.1}Y_{0.1}O_{3-\delta}$ (BSCZGY8)

FIG. 1A shows the powder X-ray diffraction (PXRD) of as-prepared Perovskite I powder. FIG. 1F shows the PXRD for the other listed compositions, for each composition, a perovskite-type phase was obtained. Only BSCZGY1 and BSCZGY3 showed an impurity phase of $(Ce,Zr)O_2$ by PXRD.

Example 2: Chemical Stability Measurements

Stability under water vapor at 90° C. was performed by suspending as-prepared powders above water in a round bottom flask fitted with a condenser for various time durations. Stability under $CO_2$ gas was measured by placing as-prepared powder inside a quartz tube and flowing pure $CO_2$ at a flow rate of 10 SCCM for 24 h or 168 h at 800° C.

Figure 2C:
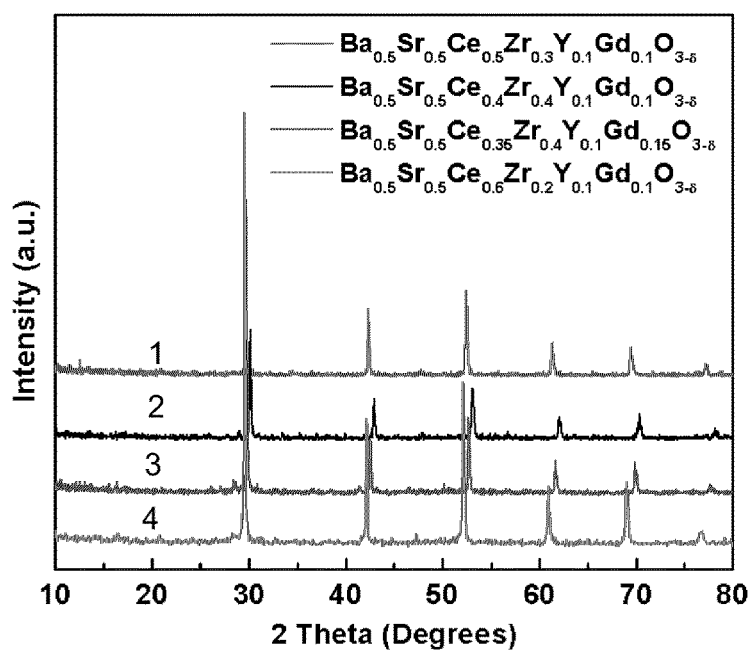
Figure 2D:
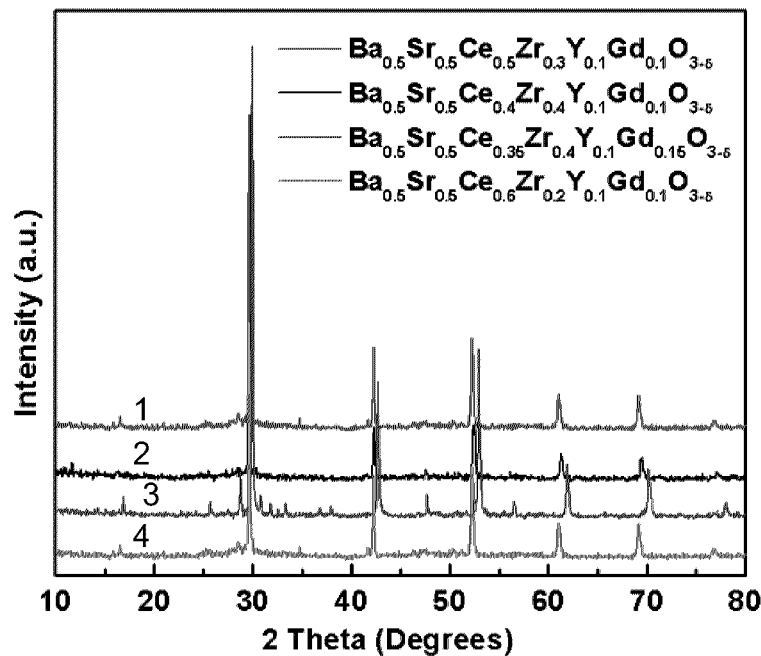
Figure 2E:
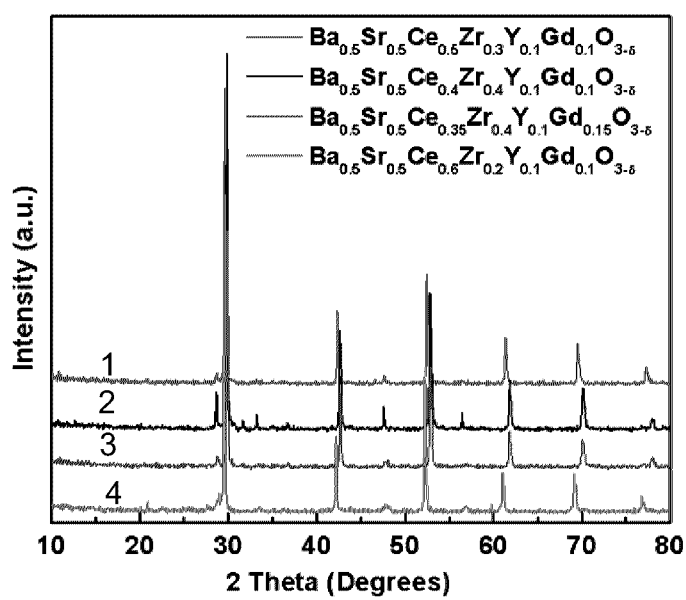

Results of stability testing of Perovskite I are found in FIG. 2A. FIGS. 2C and 2D show the PXRD pattern of BSCZGY 2-5 exposed to water vapor for 24 h and 168 h at 90° C., respectively. It can be seen that for each composition tested, there are no additional peaks after exposure to water vapor atmosphere for 24 h. In case of water vapor exposure at 90° C. for 168 h, compositions, except BSCZGY4, showed good stability against water vapor. FIG. 2E shows the PXRD pattern of as-prepared powders exposed to pure $CO_2$ at the rate of 10 SCCM at 800° C. for 24 h. PXRD patterns confirms the absence of additional peaks due to $BaCO_3$.

To simulate SOFC operating conditions, a mixture of $N_2$ and $CO_2$ (1:1 volume ratio) was purged through water that was kept at 80° C. PXRD and thermogravimetric (TGA) analysis (Mettler Toledo, TGA/DSC/HT1600) were performed on these samples before and after the stability tests. Heating rate during TGA measurements was 10° C./min. For in-situ TGA under $CO_2$ environment, the heating rate was decreased to 5° C./min and a flow of pure $CO_2$ was maintained.

In-situ high temperature HT-PXRD measurements under various gas environments were performed in a high temperature reactor chamber (Anton Paar XRK 900) from 2θ 10° and 80° at a count rate of 3 s per step of 0.05° FT-IR measurements were carried out on a Varian 7000 FT-IR spectrometer.

Example 3: Conductivity Measurements

Sintered pellets were cut into smaller disks and both sides were ground and polished to obtain the desired thickness with flat and parallel surface to one another. Pt paste was brushed on both side as electrodes and fired at 800° C. for 2 h.

Conductivity was measured using an AC impedance analyzer (Solartron electrochemical impedance spectroscopy; SI 1260) at various temperatures and under various environments. Prior to measurement, samples were held at the temperature of measurement for a minimum of 2 h and a maximum of overnight.

Figure 3C:
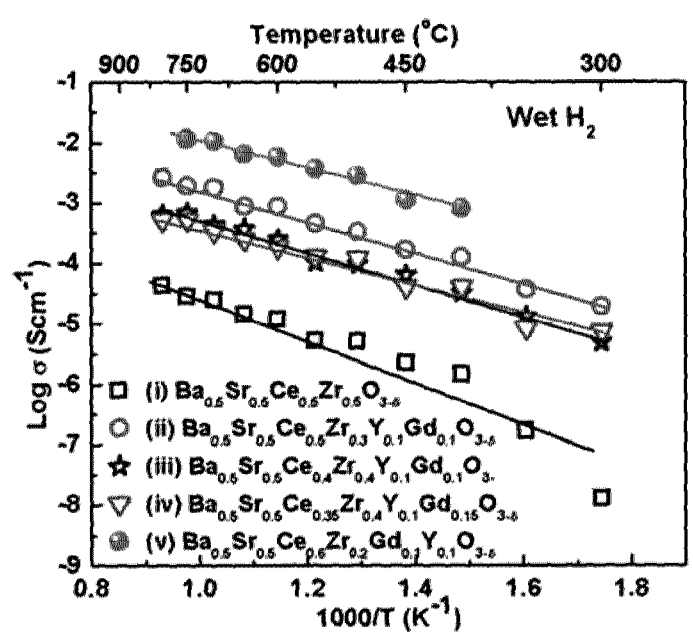

In order to be used as an electrolyte in fuel cell applications, along with excellent chemical stability, high conductivity is also beneficial. FIG. 3B illustrates conductivity measurements for Perovskite I under various listed conditions. FIG. 3C compares conductivity of certain perovskite composition, showing that Perovskite I (BSCZGY5) showed the highest conductivity ($\sim 10^{-2}$ Scm$^{-1}$) at 600° C. in wet $H_2$ among all the compositions tested.

Single fuel cell polarization measurements were carried out by passing humidified $H_2$ and air on the anode and cathode sides, respectively. During heating 5% $H_2$ was supplied and was increased to pure $H_2$ after reaching the desired temperature.

Example 4—Additional Experiments

A. Shannon Ionic Radii Comparison

A comparison of ionic radius and electronegativity between the commonly used ions suggest that only $Y^{3+}$ and $Gd^{3+}$ match the size of $Ce^{4+}$ with significantly higher electronegativity. While $Pr^{3+}$ is significantly bigger in size leading to chemical instability, $Yb^{3+}$ is actually smaller in size than $Ce^{4+}$ Thus, Gd and Y would be ideal choice for doping in barium cerates both in terms of ionic radius and electronegativity.

TABLE 1

Shannon Ionic radii and electronegativity values for some common elements used for doping in barium cerates.

| Doping element | Ionic radii (pm) | Electronegativity (neutral atom) |
| --- | --- | --- |
| $Ba^{2+}$ | 135.0 | 0.89 |
| $Sr^{2+}$ | 118.0 | 0.95 |
| $Ce^{4+}$ | 87.0 | 1.12 |
| $Zr^{4+}$ | 72.0 | 1.33 |
| $Y^{3+}$ | 90.0 | 1.22 |
| $Gd^{3+}$ | 93.8 | 1.20 |
| $Pr^{3+}$ | 99.0 | 1.13 |
| $Yb^{3+}$ | 86.8 | 1.10 |
| $Sm^{3+}$ | 95.8 | 1.17 |

B. FT-IR Analysis of $CO_2$ Treated Perovskite I

FIG. 6 illustrates the FT-IR spectra obtained for $BaCO_3$, as-prepared Perovskite I and Perovskite I after exposure to pure $CO_2$ at 800° C. for 24 h. The FT-IR peaks at 1058 (v1), 856 (v2), and 692 cm$^{-1}$ (v4) are assigned to symmetric stretching, asymmetric deformation and symmetric deformation modes of the carbonate anion respectively. The peaks at 1469 cm$^{-1}$ (v3) (asymmetric stretching) and 2449, 1749 are assigned to the surface contamination of $BaCO_3$.

C. PXRD after $H_2O$ Vapor Exposure

FIG. 7 illustrates the PXRD (Powder X-ray Diffraction) pattern obtained for Perovskite I after $H_2O$ vapor treatment for various durations indicated in the figure at 90° C.

D. TGA after $H_2O$ Vapor Exposure

FIG. 8 provides TGA plots obtained for Perovskite I after $H_2O$ vapor treatment for various durations at 90° C.

E. FT-IR of Perovskite I after $H_2O$ Vapor Exposure

Figure 9:
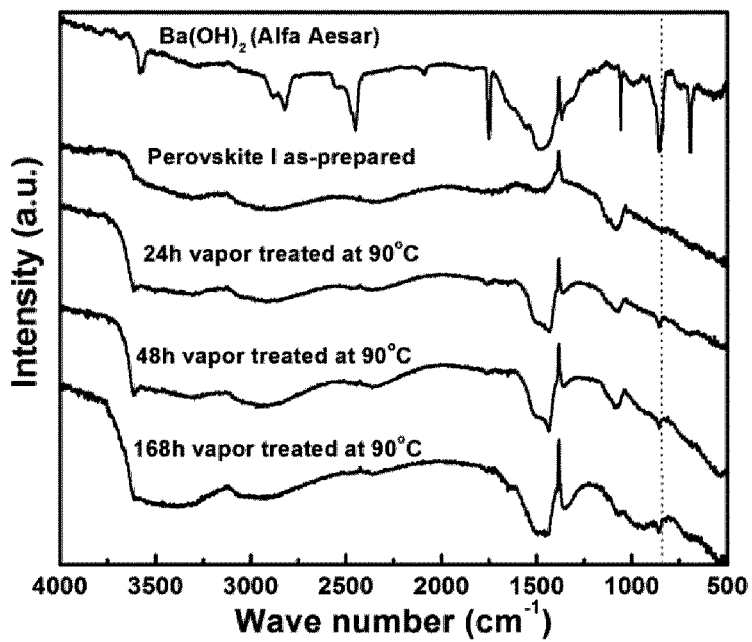
FIG. 9 illustrates FT-IR spectra obtained with $Ba(OH)_2$, Perovskite I as-prepared and Perovskite I after $H_2O$ vapor treatment for various time durations.

FIG. 9 illustrates FT-IR spectra obtained with $Ba(OH)_2$, Perovskite I as-prepared and Perovskite I after $H_2O$ vapor treatment for various time durations as indicated.

F. Comparison of PXRD Intensity Ratio

TABLE 2

PXRD peak intensity ratios for selected peaks after various stability measurements on Perovskite I samples.

| PXRD measurement | $I_{110}/I_{200}$ | $I_{110}/I_{210}$ | $I_{211}/I_{200}$ |
| --- | --- | --- | --- |
| As-prepared | 3.56 | 3.00 | 1.18 |
| 24 h $CO_2$ treated at 800° C. | 4.52 | 2.61 | 1.73 |
| 24 h vapor treated at 90° C. | 3.38 | 2.63 | 1.38 |
| 48 h vapor treated at 90° C. | 4.18 | 3.05 | 1.28 |
| 168 h vapor treated at 90° C. | 3.72 | 3.37 | 1.10 |

G. Appearance of Perovskite I

Figures 10A, 10B, 10C:
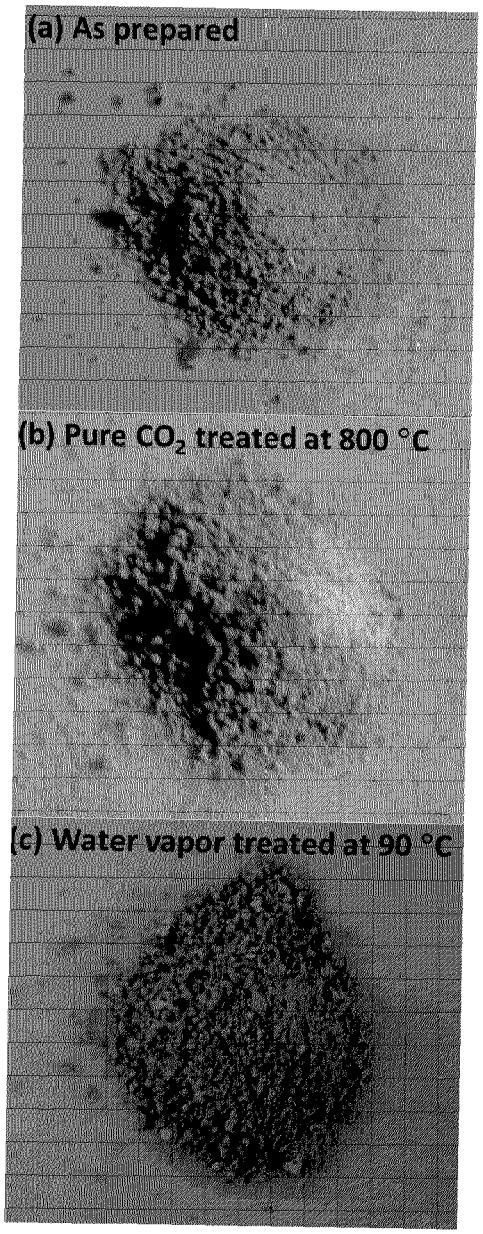
FIGS. 10A-C are photographs of (A) the appearance of as-prepared Perovskite I, (B) after exposure to pure $CO_2$ for 24 h at 800° C. and (C) after exposure to $H_2O$ vapor for 24 h at 90° C.

FIGS. 10A-C are photographs which illustrate the appearance of Perovskite I, (A) as prepared, (B) after exposure to pure $CO_2$ for 24 h at 800° C. and (C) after exposure to $H_2O$ vapor for 24 h at 90° C.

H. PXRD after 140 h Exposure to $H_2O$ Vapor and $CO_2$ at 600° C.

Figure 11:
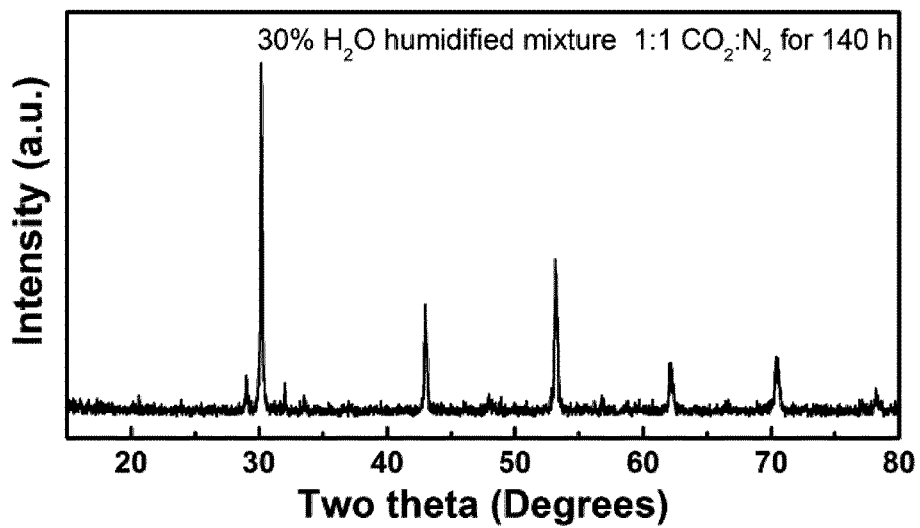
FIG. 11 illustrates the PXRD pattern obtained for Perovskite I after exposure to 30% humidified 1:1 ratio of $CO_2$:$N_2$ gas mixture for 140 h.

FIG. 11 is a graph showing the PXRD pattern obtained for Perovskite I after exposure to 30% humidified $CO_2$:$N_2$ (1:1 (V:V) ratio) gas mixture for 140 h.

I. Equivalent Circuit for Fitting Nyquist Data

Figure 12A:
FIGS. 12A and B illustrate equivalent circuits used for fitting the impedance Nyquist data obtained at 600° C.
Figure 12B:
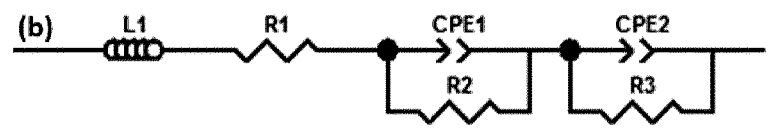

FIGS. 12A and B are drawings of the equivalent circuits used for fitting the impedance Nyquist data obtained at 600° C. as shown in FIG. 3A (FIG. 12A) under air, air+3% $H_2O$, $N_2$+3% $H_2O$ and $N_2$+3% $D_2O$ (FIG. 12B) under $H_2$+3% $H_2O$.

J. Kramers-Kronig Analysis

Figure 13:
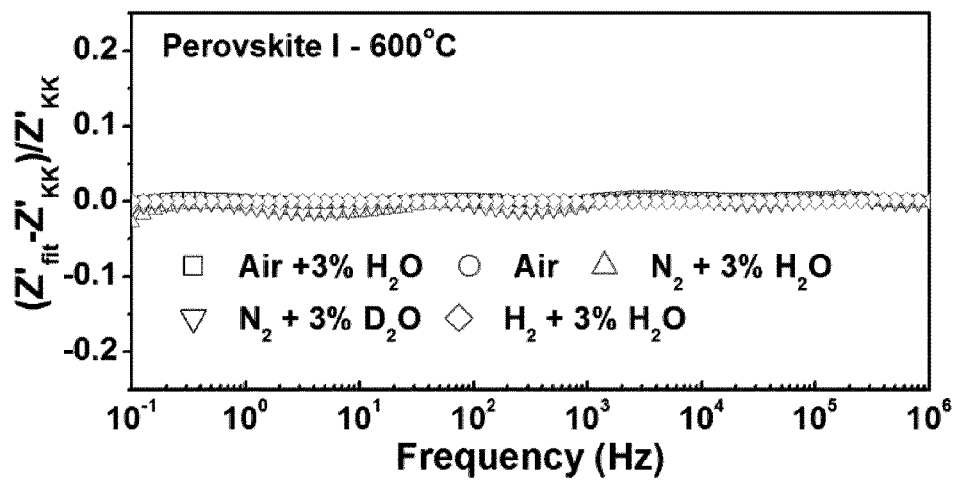
FIGS. 13A and B illustrate $Z_{fit}$-$Z_{KK}$/$Z_{KK}$ (real (A) and imaginary (B)) vs. frequency plots obtained for the Nyquist plot shown in FIG. 3A. In the case of $H_2$+3% $H_2O$ plot is between $Z_{obs}$-$Z_{fit}$/$Z_{fit}$.
Figure 13B:
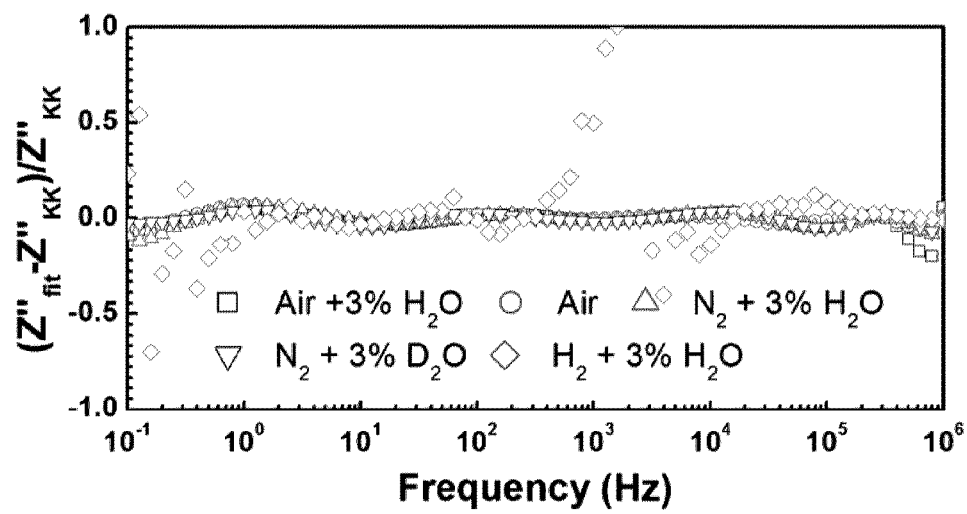

FIGS. 13A and B illustrate $Z_{fit}$-$Z_{KK}$/$Z_{KK}$ (real and imaginary, respectively) vs. frequency plots obtained for the Nyquist plot shown in FIG. 3A. In the case of $H_2$+3% $H_2O$ the plot is between $Z_{obs}$-$Z_{fit}$/$Z_{fit}$.

K. Impedance Fitting Parameters

Table 3 tabulates impedance fitting parameters and calculated capacitance values for the Nyquist plots obtained at 600° C. with Perovskite I under various operating conditions.

TABLE 3

| Parameters | Air | Air + 3% $H_2O$ | $N_2$ + 3% $H_2O$ | $N_2$ + 3% $D_2O$ |
| --- | --- | --- | --- | --- |
| R (ohm) | 118.6 | 83.98 | 110.8 | 142.3 |
| R1 (ohm) | 20.2 | 3.8 | 14.5 | 21.7 |
| Q1 | $1.7 \times 10^{-7}$ | $3.4 \times 10^{-8}$ | $3.3 \times 10^{-9}$ | $3.2 \times 10^{-8}$ |
| n | 0.85 | 1.0 | 0.98 | 0.97 |
| C1 (Farad) | $2.0 \times 10^{-8}$ | $3.4 \times 10^{-8}$ | $2.6 \times 10^{-9}$ | $2.1 \times 10^{-8}$ |
| R2 (ohm) | 276.2 | 87.1 | 237.8 | 456.1 |
| Q2 (Farad) | $2.1 \times 10^{-5}$ | $4.2 \times 10^{-5}$ | $2.4 \times 10^{-5}$ | $2.8 \times 10^{-5}$ |
| n | 0.72 | 0.72 | 0.73 | 0.64 |
| C2 (Farad) | $2.9 \times 10^{-6}$ | $4.6 \times 10^{-6}$ | $3.5 \times 10^{-6}$ | $2.5 \times 10^{-6}$ |

TABLE 3-continued

| Parameters | Air | Air + 3% $H_2O$ | $N_2$ + 3% $H_2O$ | $N_2$ + 3% $D_2O$ |
|---|---|---|---|---|
| R3 (ohm) | 79.9 | 90.6 | 355.8 | 477.1 |
| Q3 (Farad) | $4.4 \times 10^{-3}$ | $4.4 \times 10^{-3}$ | $4.2 \times 10^{-4}$ | $1.7 \times 10^{-3}$ |
| n | 0.36 | 0.33 | 0.48 | 0.40 |
| C3 (Farad) | $7.4 \times 10^{-4}$ | $7.0 \times 10^{-4}$ | $5.4 \times 10^{-5}$ | $1.2 \times 10^{-3}$ |

L. Transmission Electron Microscopic (TEM) Study

FIG. 14 illustrates a FFT pattern obtained with the HRTEM given in FIG. 1C further iterating the cubic nature of Perovskite I.

M. SEM Analysis after Stability Measurements

FIGS. 15A-D are SEM images of the Perovskite I powder chunks before and after various stability measurements (a) as-prepared, (b) after exposure to $H_2O$ vapor for 24 h, (c) after exposure to $H_2O$ vapor for 168 h and (d) after exposure to $CO_2$ at 800° C. for 24 h. The images reveal no significant change after exposure to $H_2O$ vapor or $CO_2$ for 24 h. However, upon continues exposure to $H_2O$ vapor for 168 h, cracks have appeared at the regions of grain boundary indicating water incorporation through these regions.

Figure 16:
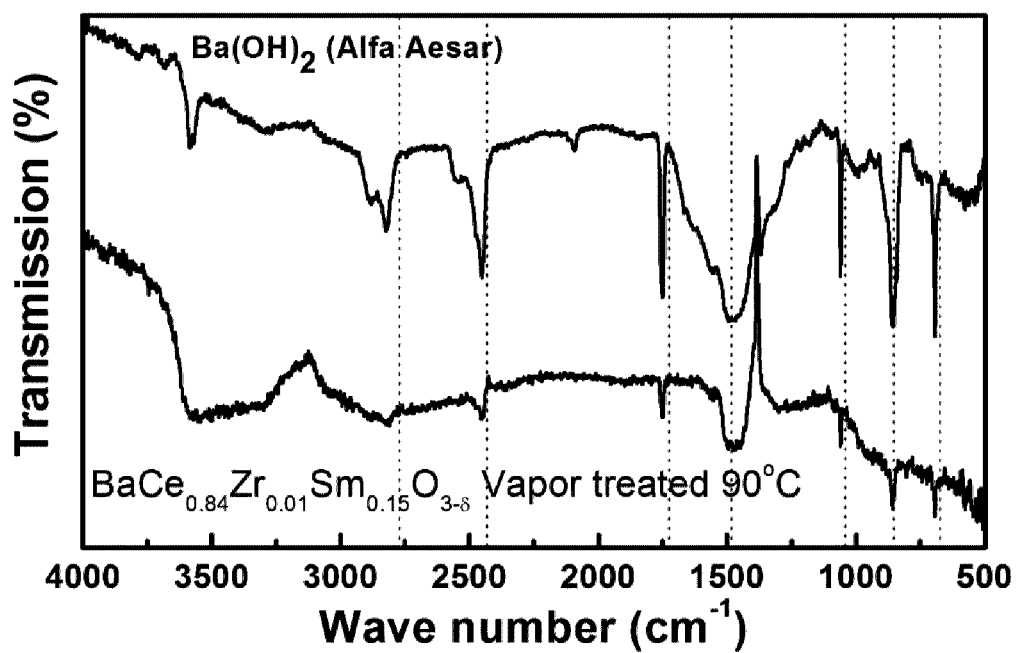
FIG. 16 illustrates FT-IR spectra obtained with $Ba(OH)_2$ and $BaCe_{0.84}Zr_{0.01}Sm_{0.15}O_{3-\delta}$ after exposure to $H_2O$ vapor for 24 h at 90° C.

N. FT-IR of $BaCe_{0.84}Zr_{0.01}Sm_{0.15}O_{3-\delta}$ after $H_2O$ Vapor Exposure FIG. 16 is a graph showing FT-IR spectra obtained with $Ba(OH)_2$ and $BaCe_{0.84}Zr_{0.01}Sm_{0.15}O_{3-\delta}$ after exposing to $H_2O$ vapor for 24 h at 90° C.

O. Thermogravimetric Analysis (TGA) Quantification

The difference in weight loss percentage between TGA obtained in air and TGA obtained under hydrogen is calculated. The excess weight loss is attributed to the loss of oxygen from the crystal matrix due to the conversion of $Ce^{4+}$ to $Ce^{3+}$ to maintain the electro neutrality.

Weight loss observed under air at 800° C.=0.273%.
Weight loss observed under air at 800° C.=0.403%.
  Difference in weight loss=0.13%.

The percentage of oxygen present in Perovskite I assuming the following composition $(Ba_{0.5}Sr_{0.5}Ce_{0.6}Zr_{0.2}Gd_{0.1}Y_{0.1}O_{2.9})$=16.235%, where 16.235% corresponds to 2.9 mole of oxygen atoms in the structural unit. 0.13% corresponds to =0.023 mole of oxygen atoms, so 2 mole of $Ce^{4+}$ to $Ce^{3+}$ conversion is required to remove 1 mole of oxygen atoms from the crystal matrix. Thus, the loss of 0.023 mole of oxygen corresponds to the conversion of 0.046 mole of $Ce^{4+}$ into $Ce^{3+}$.

Example 5: Preparation of Ni-perovskite Composites

A. Mechanical Mixing Method

In the mechanical mixing method, selected amounts of commercial NiO (99.0%, Alfa Aeser) powder and Perovskite 1, as prepared in Example 1, were ball milled together for 6 h with isopropanol. After ball milling, the mixed powders were dried in oven at 80° C. Composite powders with volume ratios of 30:70, 40:60, 50:50 (Ni: Perovskite I) were prepared.

B. Combustion Method

Figure 23:
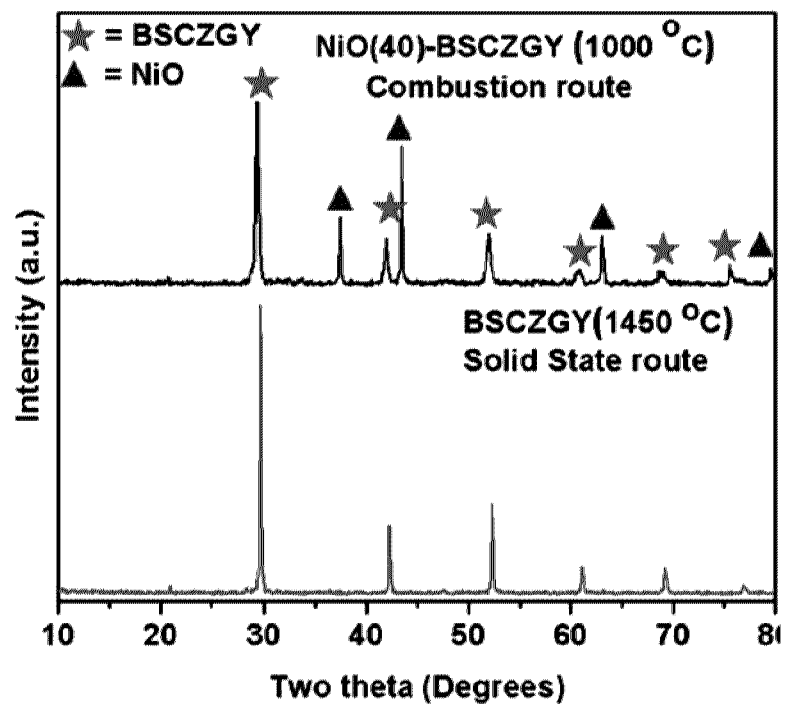
FIGS. 23A and B provide an illustration of the (A) powder-X-ray diffraction pattern and (B) cross-section SEM of an exemplary NiO-BSCZGY material prepared by the auto-combustion method, specifically NiO(40)-BSCZGY where BSCZGY is Perovskite I.
Figure 23B:
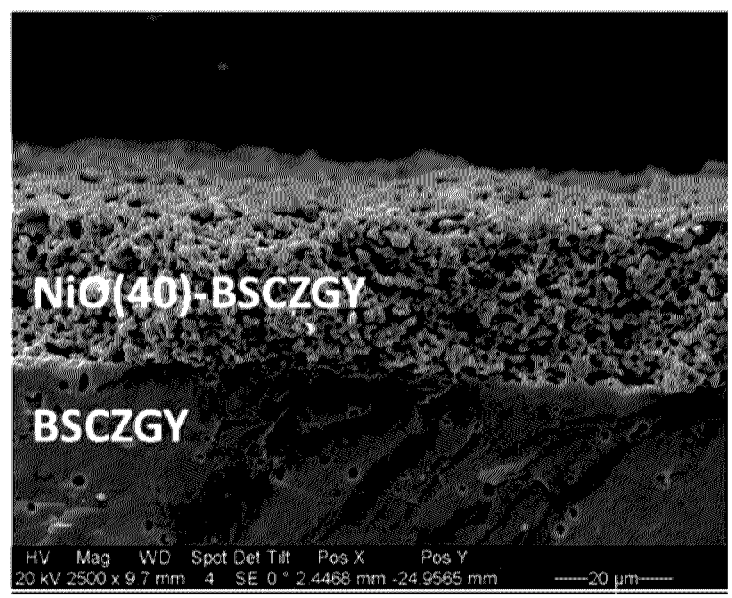

NiO-BSCZGY anode composite powders with volume ratios of 30:70, 40:60, 50:50 (Ni: Perovskite I) were prepared by an auto-ignition method in one single step. (See FIGS. 23A and B) Higher Ni content compositions of 60:40 and 70:30 can also be made using this method. Stoichiometric amount of $Ba(NO_3)_2.6H_2O$ (>99%, Alfa Aeser), $Sr(NO_3)_2.6H_2O$ (99.0%, Alfa Aeser), $Ce(NO_3)_2.6H_2O$ (99.5%, Alfa Aeser), $Zr(NO_3)_2.6H_2O$ (99.9%, Alfa Aeser), $Y(NO_3)_2.6H_2O$ (99.9%, Alfa Aeser), $Gd(NO_3)_2.6H_2O$ (99.9%, Alfa Aeser), and $Ni(NO_3)_2.6H_2O$ (98.0%, Alfa Aeser) are first dissolved in distilled water at room temperature. Citric acid monohydrate (99.5%, Alfa Aeser), a complexing agent, was added to the metal solution (Metal ion: Citric acid=1:1.5) at 90° C. while stirring. The temperature of the mixture was maintained at 90° C. with stirring until the water evaporated and a yellow/brownish gel was formed. The gel ignited, resulting in a brown colored ash. Single phase NiO-Perovskite I powder was obtained by calcination of the brown colored ash at 1000° C. for 5 h. Alternatively, glycine and urea can be used as complexing agent [45, 46].

C. Comparisons of Anodes Prepared Using Powders of A and B.

Figure 17A:
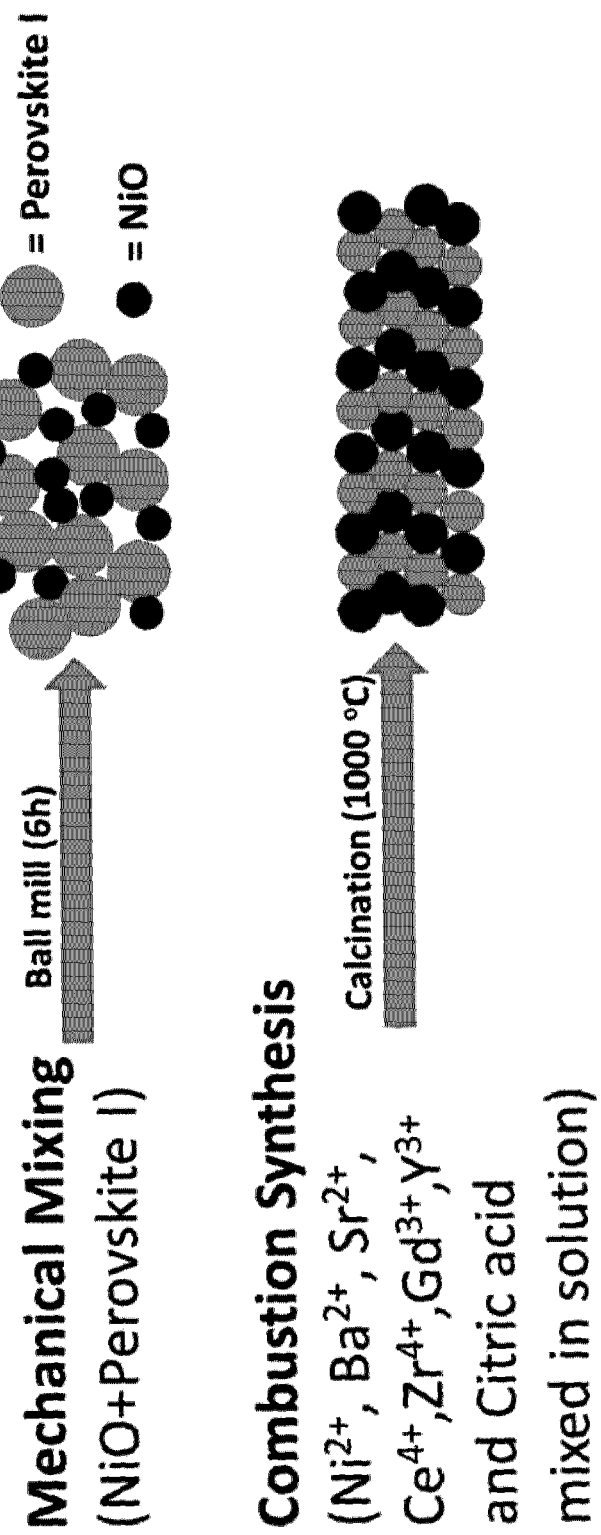
Figure 18A:
FIGS. 18A and B illustrate SEM-EDS elemental analysis of the interface between an exemplary dense solid proton-conducting electrolyte made with a proton-conducting metal oxide of formula I and an exemplary anode material (prior to reduction) consisting of NiO and BSCZGY [specifically Perovskite I]. The measurement is made using a cell formed as illustrated in FIG. 18A by screen printing NiO-BSCZGY followed by sintering at 1200° C. for 3 hours. Volume ratio of Ni to BSCZGY is 40:60.
Figure 18B:
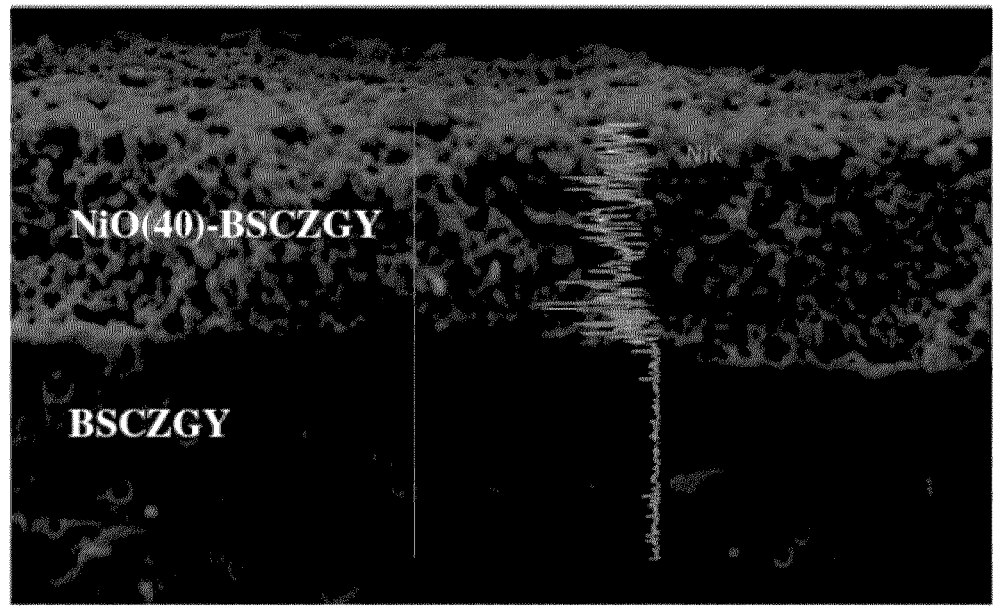
As shown in FIG. 18B, the Ni signal is high in the anode, but decreases in the BSCZGY electrolyte. The SEM-EDS shows little Ni diffusion between layers.
Figure 19A:
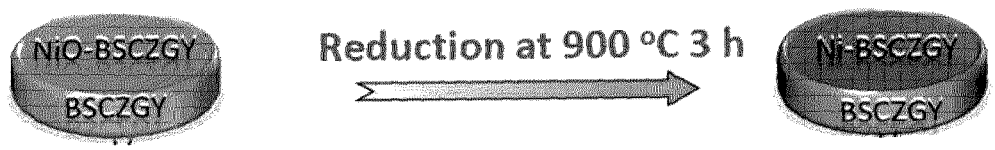
FIGS. 19A-C illustrate cross-section SEM micrographs assessing the morphology of exemplary anode/electrolyte interfaces. SEM micrograph (B) is of a NiO40/BSCZGY (anode)/BSCZGY (electrolyte) interface before reduction of the NiO in the anode and (C) is of the Ni40/BSCZGY/BSCZGY interface after reduction of NiO.
Figure 19B:
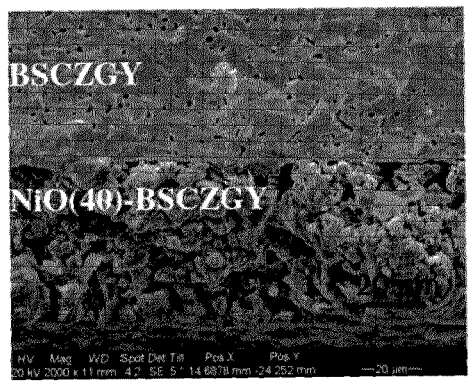
Figure 19C:
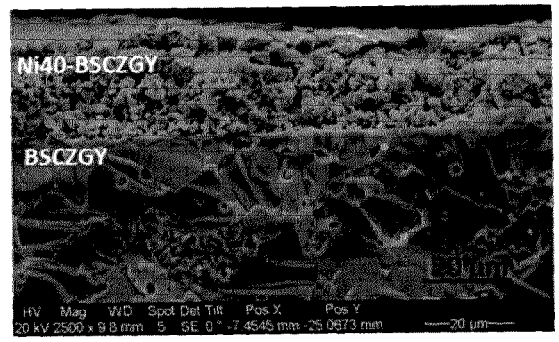
Figure 20A:
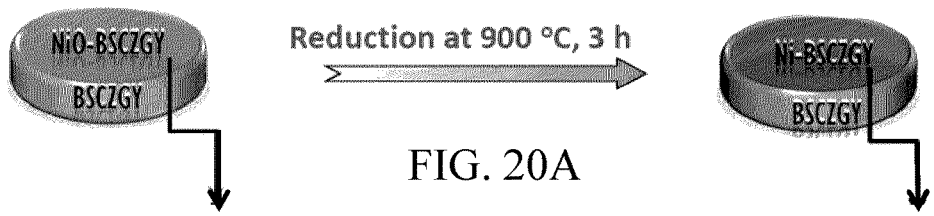
FIGS. 20A-C illustrate SEM micrographs of an exemplary anode material before (B) and after (C) reduction of NiO.
Figure 20B:
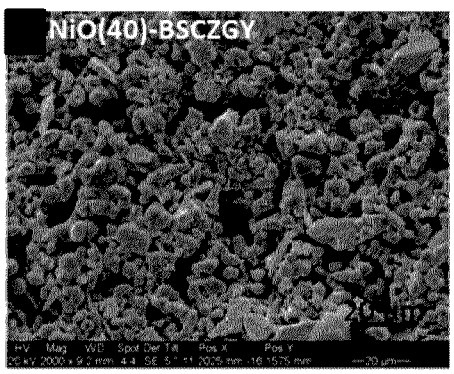
Figure 20C:
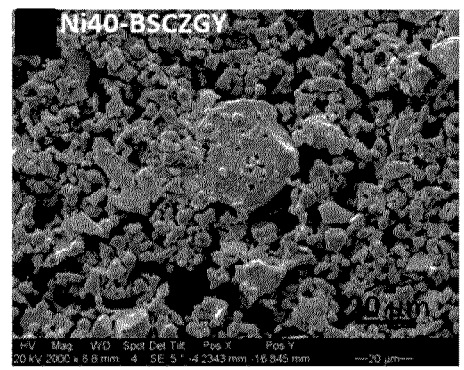
Figure 21A:
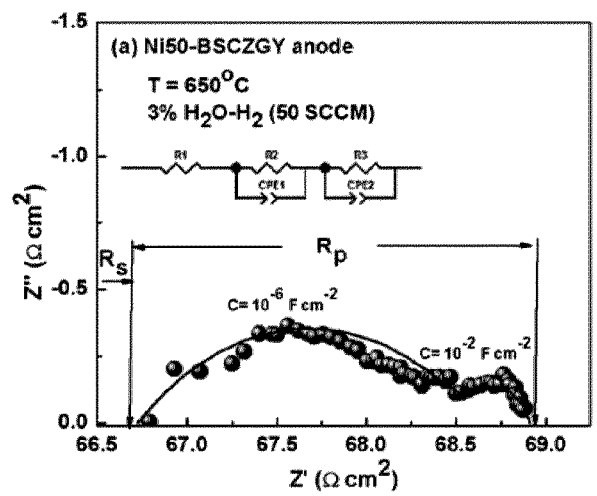
FIGS. 21A and B illustrate a comparison of impedance plots measured on symmetrical cells of BSCZGY with screen printed layers of Ni-BSCZGY anode material on opposite surfaces of the BSCZGY as a function of the Ni content of the anode material. (A) The volume ratio of Ni to BSCZGY is 50:50. The impedance plot (FIG. 21A) shows two semi-circles. The polarization resistance (Rp)=1.6 $\Omega cm^2$. The series resistance (Rs) is 66.7 $\Omega cm^2$. (B) The volume ratio of Ni to BSCZGY is 40:60. BSCZGY in these experiments is Perovskite I. The impedance plot (FIG. 21B) shows two semi-circles. The polarization resistance (Rp)=4.3 $\Omega cm^2$. The series resistance (Rs) is 101.6 $\Omega cm^2$. The Ni50-BSCZGY composite shows better electrical performance.
Figure 21B:
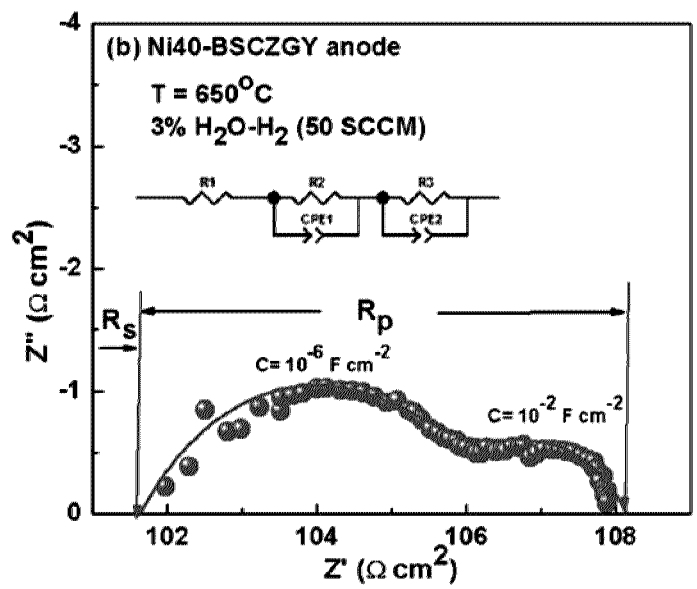
Figure 22A:
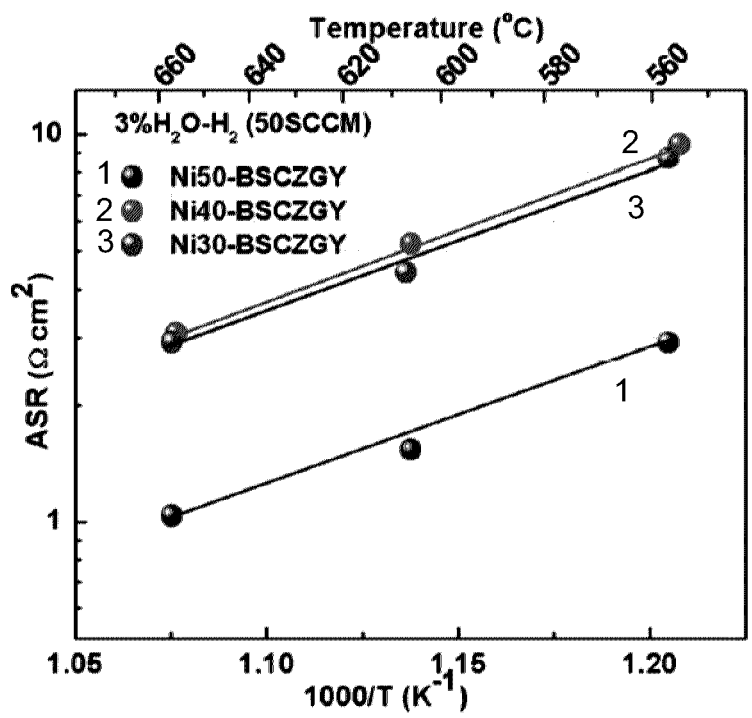
FIGS. 22A and B illustrate comparisons of ASR values. (A) Compares ASR values of Ni-BSCZGY anode materials as a function of Ni content and temperature. The Ni50-BSCZGY composite gives the lowest ASR value of the materials compared. Note that BSCZGY here is Perovskite I. (B) Compares ASR values of Ni50-BSCZGY with those of several literature materials (See: G. C. Mathera et al. (2003) Solid State Ionics 158:333 and L. Bi et al. (2011) J. Electrochemical Society 158(7):8797.) Materials exhibiting lower ASR values are more preferred for use as anodes.
Figure 22B:
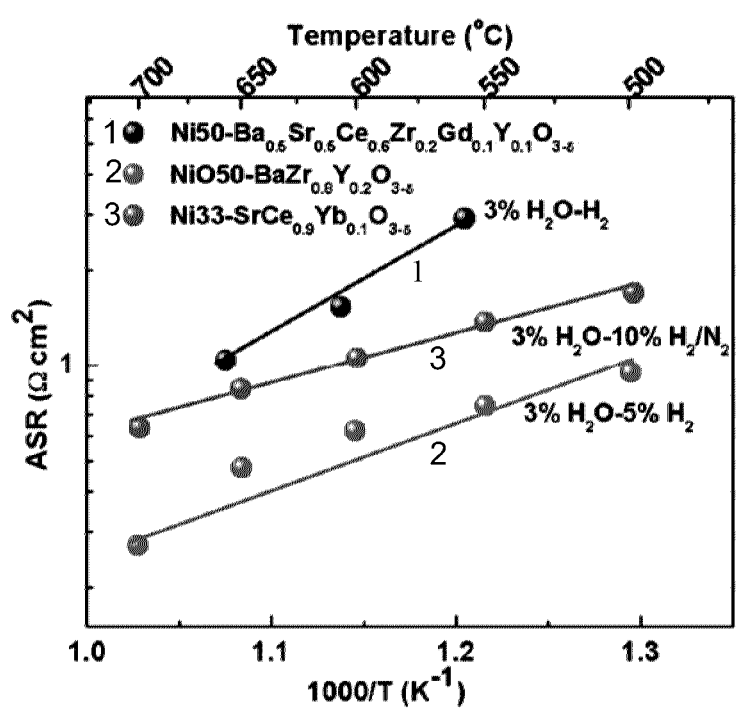

FIGS. 17B and 17C provide a comparison of the morphology of anodes prepared from NiO-proton-conducting metal oxide composites prepared by the mechanical mixing method (A) or combustion method (B). FIG. 17A is a scheme comparing the methods. A more uniform microstructure is observed with anodes prepared from NiO—composites prepared by method B (combustion).

Electrical characteristics of anode composites were studied through symmetrical cells. Symmetrical cells were prepared as follows: NiO-BSCZGY slurry was prepared by mixing NiO-BSCZGY powders with organic components and milled for 2 h at the rate of 300 rpm. Organic components were alpha-terpineol, butyl benzyl phthalate, ethyl cellulose and 1-butanol. NiO-BSCZGY slurry was screen printed on each sides of a polished Perovskite I pellet and then sintered at 1200° C. for 3 h at the heating rate of 2 degree per minute in order to make symmetrical cells. NiO-BSCZGY was reduced to Ni-BSCZGY at 900° C. for 3 h in 3% $H_2O$—$H_2$.

FIGS. 18A-B, 19A-C, 20A-C, 21A-B, and 22A-B show results of the assessment of morphology and electrical properties of NiO-BSCZGY and Ni-BSCZGY materials as anodes.

Example 6: Proton-Conducting SOFC

Electrolyte supported SOFC cells with the following configuration; Ni-Perovskite I/Perovskite I/Cathode are prepared. A dense solid electrolyte element (e.g., a plate or disc) is prepared by shaping and sintering. Anode composite slurry is screen printed on one side of the Perovskite I plate, and the other side of Perovskite I is screen printed by cathode slurry. The screen printed Perovskite I plate is fired at 1200° C. for 3 h at the rate of 2 degree per minute. The porous anode layer is about 30-40 μm in thickness, the electrolyte layer is about 400-600 μm. $BaZr_{0.8-x}Pr_xY_{0.2}O_{3-\delta}$, $BaCe_{0.8-x}Pr_xY_{0.2}O_{3-\delta}$, $Ba(Pr_{0.8}Gd_{0.2})O_{2.9}$, are used for the cathode. The porous cathode layer is about 30-40 μm thick. The cells are provided with an external electrical circuit between the electrodes. Each electrode may be provided with a current collector.

The SOFC cells are operated at temperatures ranging from 400 to 800° C., preferably at 650-750° C. Electrical energy is generated by oxidation of fuel at the anode and reduction of oxygen at the cathode. A fuel gas preferably containing hydrogen is provided in contact with anode and an oxygen-containing gas is provided in contact with the cathode. The fuel gas and the oxygen-containing gas may further contain $CO_2$ and/or water.

Example 7: Cathodes for Use with Doped $BaCeO_3$ Proton-Conducting Metal Oxide Electrolytes and/or Anodes $GdPrBaCo_{2-x}Fe_xO_{5+\delta}$ materials are synthesized by solid state reaction methods which comprise mixing stoichiometric amounts of $Gd_2O_3$, $Pr_6O_{11}$, $BaCO_3$, $CoCO_3$, and $Fe_2O_3$ in roll mill for 24 h, drying and calcining the resultant precursor powders. In general, the powders at calcined at temperatures from 900 to 1000° C. for 10-20 h. Powders may be subjected to multiple calcining steps. Preferably, perovskite-type materials result from calcining. More preferably the resultant materials are single phase perovskite-type materials. In specific embodiments, the calcined materials are cubic or orthorhombic perovskites.

$GdPrBaCo_2O_{5+\delta}$ and $GdPrBaCoFeO_{5+\delta}$ were synthesized by solid state reaction methods by mixing stoichiometric amounts of $Gd_2O_3$, $Pr_6O_{11}$, $BaCO_3$, $CoCO_3$, and $Fe_2O_3$ in roll mill for 24 h, drying the precursor powders and calcining the powders at selected temperatures. $GdPrBaCo_2O_{5+\delta}$ attained an orthorhombic phase with space group Pmmm (see FIG. 25A) after calcining precursor powders at 900° C. twice (10 h each), $GdPrBaCoFeO_{5+\delta}$ attained cubic phase (see FIG. 25B) after calcination at 1000° C. for 20 h.

Figure 26:
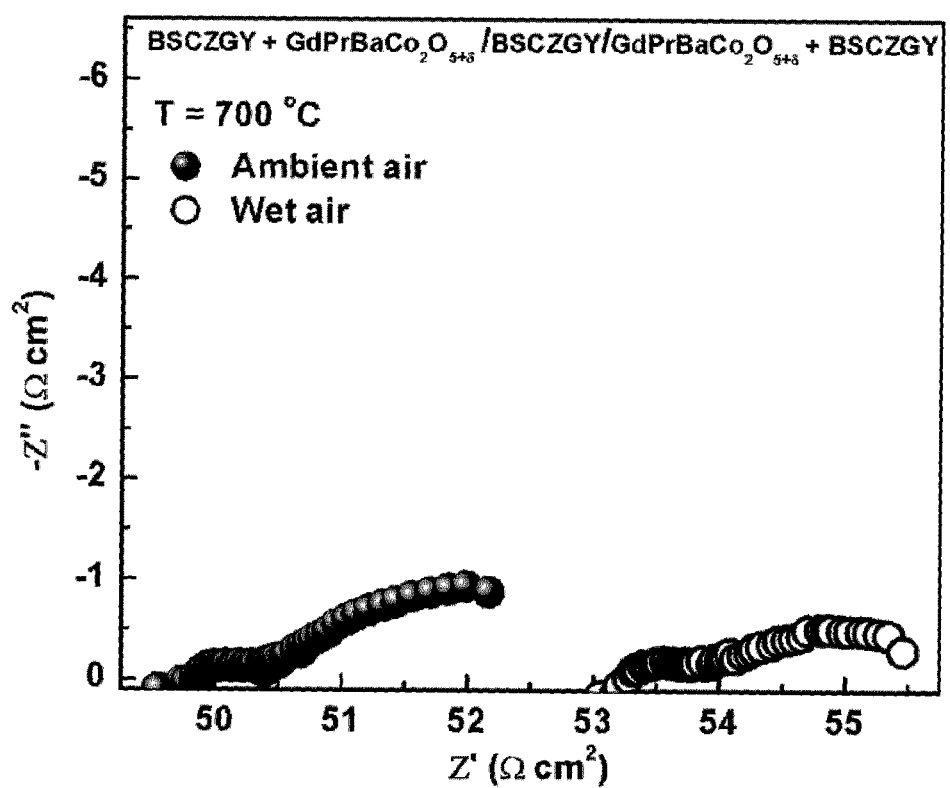
FIG. 26 provides Nyquist plots of the symmetrical cell ($Ba_{0.5}Sr_{0.5}Ce_{0.6}Zr_{0.2}Gd_{0.1}Y_{0.1}O_{3-\delta}$+$GdPrBaCo_2O_{5+\delta}$/$Ba_{0.5}Sr_{0.5}Ce_{0.6}Zr_{0.2}Gd_{0.1}Y_{0.1}O_{3-\delta}$ measured in ambient air and wet air (as indicated) at 700° C.
Figure 27:
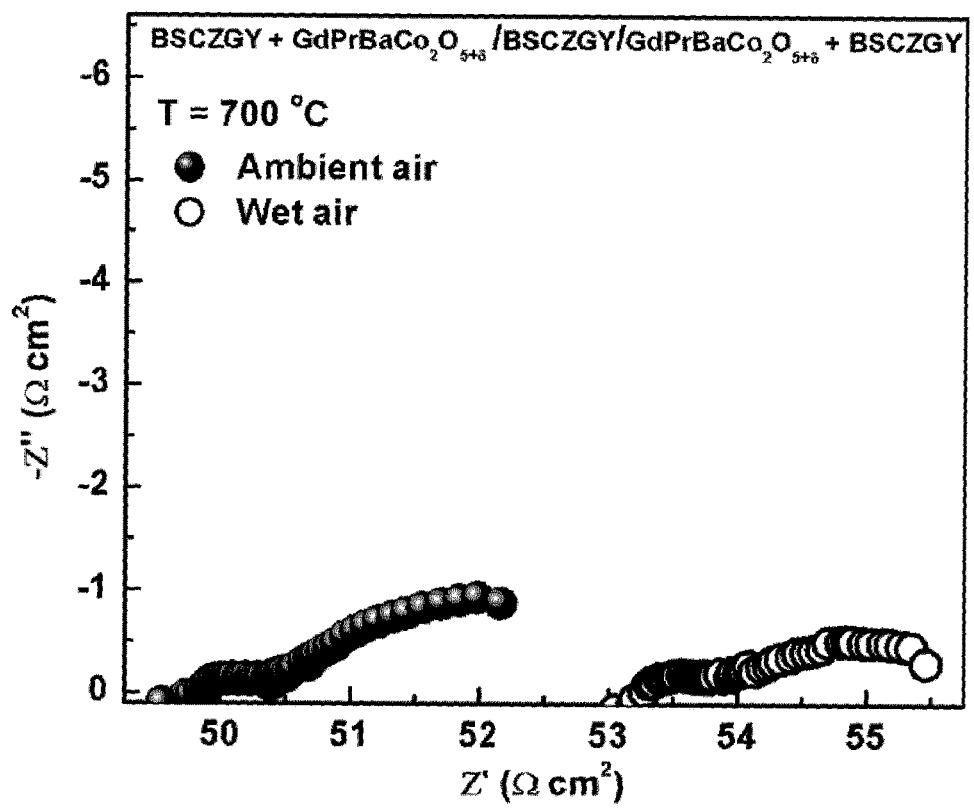
FIG. 27 provides the Arrhenius plot of total ASR for the symmetrical cell ($Ba_{0.5}Sr_{0.5}Ce_{0.6}Zr_{0.2}Gd_{0.1}Y_{0.1}O_{3-\delta}$+$GdPrBaCo_2O_{5+\delta}$/$Ba_{0.5}Sr_{0.5}Ce_{0.6}Zr_{0.2}Gd_{0.1}Y_{0.1}O_{3-\delta}$.

Symmetrical cells of the following configuration:
BSCZGY+$GdPrBaCo_2O_{5+\delta}$/BSCZGY/$GdPrBaCo_2O_{5+\delta}$+BSCZGY
were prepared as illustrated in FIG. 24 for studying electrochemical performance in air and wet air atmospheres. At 700° C., area specific resistance (ASR) of the symmetrical cells were 2 $\Omega cm^2$ and 1.6 $\Omega cm^2$ in ambient air and wet air, respectively (FIG. 26). The activation energy for the overall cathode process in air and wet air was found to be 0.77 and 0.76 eV, respectively (FIG. 27).

REFERENCES

1. Chu, S. & Majumdar, A. Opportunities and challenges for a sustainable energy future. Nature 488, 294-303 (2012).
2. Sorrell, S., Speirs, J., Bentley, R., Miller, R. & Thompson, E. Shaping the global oil peak: a review of the evidence on field sizes, reserve growth, decline rates and depletion rates. Energy 37, 709-724 (2012).
3. Tao, S. & Irvine, J. T. S. A redox-stable efficient anode for solid-oxide fuel cells. Nat Mater 2, 320-323 (2003).
4. Daniele, P. et al. High proton conduction in grain-boundary-free yttrium-doped barium zirconate films grown by pulsed laser deposition. Nature Materials 9, 846-852 (2000).
5. Kreuer, K. D. Proton-conducting oxides. Annual Review of Materials Research 33, 333-359 (2003).
6. Lorenzo, M., Craig, A. J. F. & Islam, M. S. Oxide-ion and proton conducting electrolyte materials for clean energy applications: structural and mechanistic features. Chem. Soc. Rev. 38, 4370-4387 (2010).
7. Song, C. Fuel processing for low-temperature and high-temperature fuel cells Challenges, and opportunities for sustainable development in the 21st century. Catalysis Today. 77, 17-49 (2002).
8. Edwards, P. P., Kuznetsov, V. L., David, W. I. F. & Brandon, N. P. Hydrogen and fuel cells: towards a sustainable energy future. Energy Policy 36, 4356-4362 (2008).
9. Ryu, K. H. & Haile, S. M. Chemical stability and proton conductivity of doped $BaCeO_3$—$BaZrO_3$ solid solutions. Solid State Ionics 125, 355-367 (1999).
10. Taniguchi, N., Hatoh, K., Niikura, J., Gamo, T. & Iwahara, H. Proton conductive properties of gadolinium-doped barium cerates at high temperatures. Solid State Ionics. 53, 998-1003 (1992).
11. Yang, L. et al. Enhanced sulfur and coking tolerance of a mixed ion conductor for SOFCs: $BaZr_{0.1}Ce_{0.7}Y_{0.2-x}Yb_xO_{3-\delta}$. Science 326, 126-129 (2009).
12. Wu, J., Davies, R. A., Islam, M. S. & Haile, S. M. Atomistic study of doped $BaCeO_3$: dopant site-selectivity and cation nonstoichiometry. Chemistry of Materials 17, 846-851 (2005).
13. Glöckner, R., Islam, M. S. & Norby, T. Protons and other defects in $BaCeO_3$: a computational study. Solid State Ionics 122, 145-156 (1999).
14. Hung, I. M., Peng, H. W., Zheng, S. L., Lin, C. P. & Wu, J. S. Phase stability and conductivity of $Ba_{1-y}Sr_yCe_{1-x}Y_xO_{3-\delta}$ solid oxide fuel cell electrolyte. Journal of Power Sources 193, 155-159 (2009).
15. Fabbri, E., D'Epifanio, A., Di Bartolomeo, E., Licoccia, S. & Traversa, E. Tailoring the chemical stability of $Ba(Ce_{0.8-x}Zr_x)Y_{0.2}O_{3-\delta}$ protonic conductors for intermediate temperature solid oxide fuel cells (IT-SOFCs). Solid State Ionics 179, 558-564 (2008).
16. Snijkers, F. M. M., Buekenhoudt, A., Cooymans, J. & Luyten, J. J. Proton conductivity and phase composition in $BaZr_{0.9}Y_{0.1}O_{3-\delta}$. Scripta Materialia 50, 655-659 (2004).
17. Liu, Y., Guo, Y., Ran, R. & Shao, Z. A new neodymium-doped $BaZr_{0.8}Y_{0.2}O_{3-\delta}$ as potential electrolyte for proton-conducting solid oxide fuel. Journal of Membrane Science 415, 391-398 (2012).
18. Pagnier, T., Charrier-Cougoulic, I., Ritter, C. & Lucazeau, G. A neutron diffraction study of $BaCe_xZr_{1-x}O_3$. The European Physical Journal—Applied Physics 9, 1-9 (2000).
19. Roedel, E., Urakawa, A., Kureti, S. & Baiker, A. On the local sensitivity of different IR techniques: Ba species relevant in NOx storage-reduction. Physical Chemistry Chemical Physics 10, 6190-6198 (2008).
20. Agarwal, P., Moghissi, 0. C., Orazem, M. E. & Garcia-Rubio, L. H. Application of measurement models for analysis of impedance spectra. Corrosion 49, 278-289 (1993).
21. Boukamp, B. A. Electrochemical impedance spectroscopy in solid state ionics: recent advances. Solid State Ionics 169, 65-73 (2004).
22. Kannan, R., Gill, S., Maffei, N. & Thangadurai, V. $BaCe_{0.85-x}Zr_xSm_{0.15}O_{3-\delta}$ (0.01<x<0.3) (BCZS): effect of Zr content in BCZS on chemical stability in $CO_2$ and $H_2O$ vapor, and proton conductivity. Journal of The Electrochemical Society 160, F18-F26 (2012).
23. Gill, S., Kannan, R., Maffei, N. & Thangadurai, V. Effect of Zr substitution for Ce in $BaCe_{0.8}Gd_{0.15}Pr_{0.05}O_{3-\delta}$ on the chemical stability in $CO_2$ and water, and electrical conductivity. RSC Advances 3, 3599-3605 (2013).
24. Babilo, P., Uda, T. & Haile, S. M. Processing of yttrium-doped barium zirconate for high temperature proton conductivity. Journal of Material Research 22, 1322-1330 (2007).
25. Serra, J. M. & Meulenberg, W. A. Thin-film proton $BaZr_{0.85}Y_{0.15}O_3$ conducting electrolytes: toward intermediate-temperature solid oxide fuel cell alternative. J. Am. Ceram. Soc. 90, 2082-2089 (2007).
26. Zuo, C., Zha, S., Liu, M., Hatano, M. & Uchiyama, M. $Ba(Zr_{0.1}Ce_{0.7}Y_{0.2})O_{3-\delta}$ as an electrolyte for low-temperature solid-oxide fuel cells. Advanced Materials 18, 3318-3320 (2006).
27. Matsumoto, H., Kawasaki, Y., Ito, N., Enoki, M. & Ishihara, T. Relation between electrical conductivity and chemical stability of $BaCeO_3$-based proton conductors with different trivalent dopants. Electrochemical and Solid-State Letters 10, B77-B80 (2007).

28. Bhide, S. V. & Virkar, A. V. Stability of BaCeO₃-based proton conductors in water containing atmospheres. Journal of The Electrochemical Society 146, 2038-2044 (1999).
29. Schober, T. & Coors, W. G. Entry and exit of water vapor in bulk ceramic proton conductors. Solid State Ionics 176, 357-362 (2005).
30. Schober, T., Friedrich, J., Triefenbach, D. & Tietz, F. Dilatometry of the high temperature proton conductor Ba$_3$Ca$_{1.18}$Nb$_{1.82}$O$_{9-\delta}$. Solid State Ionics 100, 173-181 (1997).
31. Haugsrud, R. & Norby, T. Proton conduction in rare-earth ortho-niobates and ortho-tantalates. Nat Mater 5, 193-196 (2006).
32. W. Suksamai, I. S. Metcalfe, Solid State Ionics 178, 627 (2007).
33. N. Taniguchi, K. Hatoh, J. Niikura and T. Gamo, Solid State Ionics 53-56, 998 (1992).
34. T. Yajima and H. Iwahara, Solid State Ionics 47, 117 (1991).
35. T. Schober and H. G. Bohn, Solid State Ionics 127, 351 (2000).
36. R. J. Gorte, J. M. Vohs and S. McIntosh, Solid State Ionics 175, 1 (2004).
37. A. Sanson, P. Pinasco and E. Roncari, Journal of the European Ceramic Society 28, 1221 (2008).
38. Feng Zhao and Anil V. Virkar, Journal of Power Sources 141, 79 (2005).
39. B. H. Rainwater, M. Liu, M. Liu, International Journal of Hydrogen Energy, 37, 18342 (2012).
40. A. Atkinson, S. Barnett, R. J. Gorte, J. T. S. Irvine, A. J. Mcevoy, M. Mogensen, S. C. Singhal and J. Vohs, Nature Materials 3, 17 (2004).
41. Zhe Lu, Li Peia, Tian-min He, Xi-Q. Huanga, Z. Guo Liu, Yuan Ji, X. Hai, Z. W. H. Su, Journal of Alloys and Compounds 334, 299 (2002).
42. S. Park, J. M. Vohs and R. J. Gorte, Nature 40, 65 (2000).
43. E. Fabbri, D. Pergolesi and E. Traversa, Chemical Society Reviews 39, 4355 (2010).
44. R. Kannan, S. Gill, K. Singh, T. Fürstenhaupt and V. Thangadurai, Scientific Report 3, 2138 (2013).
45. A. Essoumhi, G. Taillades, M. T. Jacquin, D. J. Jones and J. Rozière, Solid State Ionics 179, 2155 (2008).
46. G. C. Mather, F. M. Figueiredo, D. P. Fagg, T. Norby, J. R. Jurado and J. R. Frade, Solid State Ionics 158, 333 (2003).
47. E. Fabbri, L. Bi, D. P. and E. Traversa, Energy Environ. Sci. 4, 4984 (2011).
48. C. Zuo, S. Zha, M. Liu, M. Hatano, and M. Uchiyama, Adv. Mater. 18, 3318 (2006),
49. R. Mukundan, P. K. Davies and W. L. Worrell, Journal of Electrochemical Society 148, A82 (2001),
50. R. Peng, T. Wu, W. Liu, X. Liu and G. Meng, J. Mater. Chem. 20, 6218 (2010).
51. E. Fabbri, L. Bi, D. Pergolesi, and E. Traversa, Adv. Mater. 24, 195 (2012).
52. E. Fabbri, L. Bi, H. Tanaka, D. Pergolesi, and E. Traversa, Adv. Funct. Mater. 21, 158 (2011).
53. Z. Wu and M. Liu, Journal of Electrochemical Society 144, 2170 (1997).
54. E. Fabbri, D. Pergolesi, and E. Traversa (2010) Chem. Soc. Rev. 39:4355-4369.
55. E. Fabbri, D. Pergolesi, and E. Traversa (2010) Sci. Technol. Adv. Mat. 11 044301.
56. C. Zuo, M. Liu and M. Liu (2012) Solid Oxide Fuel Cells in M. Aparicio et al. (eds.), *Sol-Gel Processing for Conventional and Alternative Energy, Advances in Sol-Gel Derived Materials and Technologies*, Chapter 2, DOI: 10.1007/978-1-4614-1957-O_2,_ Springer Science+Business Media New York 2012

We claim:
1. A metal oxide of formula I:

$$Ba_{1-x}Sr_xCe_{1-y1-y2-y3}Zr_{y1}Gd_{y2}Y_{y3}O_{3-\delta}$$

where x, y1, y2, and y3 are numbers as follows:
x is 0.4 to 0.6;
y1 is 0.1 to 0.5;
y2 is 0.05 to 0.15
y3 is 0.05 to 0.15, where all ranges are inclusive, and
δ is a number that varies such that the metal oxide composition is charge neutral.

2. The metal oxide of claim 1, wherein y1 is 0.1 to 0.3, y2=y3 and x is 0.4 to 0.6.

3. The metal oxide of claim 1, which is
$Ba_{0.5}Sr_{0.5}Ce_{0.6}Zr_{0.2}Gd_{0.1}Y_{0.1}O_{3-\delta}$,
$Ba_{0.5}Sr_{0.5}Ce_{0.5}Zr_{0.3}Gd_{0.1}Y_{0.1}O_{3-\delta}$,
$Ba_{0.5}Sr_{0.5}Ce_{0.4}Zr_{0.4}Gd_{0.1}Y_{0.1}O_{3-\delta}$, or
$Ba_{0.5}Sr_{0.5}Ce_{0.7}Zr_{0.1}Gd_{0.1}Y_{0.1}O_{3-\delta}$.

4. A dense, proton-conducting solid electrolyte comprising the metal oxide of claim 1.

5. A composite of Ni or NiO and the proton-conducting metal oxide of claim 1, wherein the volume ratio of Ni to the proton-conducting metal oxide in the composite ranges from 30:70 to 70:30.

6. The composite of claim 5, wherein the volume ratio of Ni to the proton-conducting metal oxide in the composite ranges from 45:55 to 55:45.

7. An anode for a proton-conducting solid oxide fuel cell which comprises a composite of Ni or NiO and the proton-conducting metal oxide of claim 1, wherein the volume ratio of Ni to the proton-conducting metal oxide in the composite ranges from 30:70 to 70:30.

8. The anode of claim 7, wherein the proton-conducting metal oxide is selected from
$Ba_{0.5}Sr_{0.5}Ce_{0.6}Zr_{0.2}Gd_{0.1}Y_{0.1}O_{3-\delta}$,
$Ba_{0.5}Sr_{0.5}Ce_{0.5}Zr_{0.3}Gd_{0.1}Y_{0.1}O_{3-\delta}$,
$Ba_{0.5}Sr_{0.5}Ce_{0.4}Zr_{0.4}Gd_{0.1}Y_{0.1}O_{3-\delta}$, or
$Ba_{0.5}Sr_{0.5}Ce_{0.7}Zr_{0.1}Gd_{0.1}Y_{0.1}O_{3-\delta}$.

9. A composite of the proton-conducting metal oxide of claim 1, and a metal selected from Ni, Cu, Au, Ag or mixtures thereof.

10. A proton-conducting solid oxide fuel cell (SOFC) comprising:
a dense, solid, proton-conducting electrolyte between an anode and a cathode, wherein the electrolyte comprises the proton-conducting metal oxide of claim 1.

11. The proton-conducting SOFC of claim 10, wherein the proton-conducting metal oxide of the electrolyte is selected from
$Ba_{0.5}Sr_{0.5}Ce_{0.6}Zr_{0.2}Gd_{0.1}Y_{0.1}O_{3-\delta}$,
$Ba_{0.5}Sr_{0.5}Ce_{0.5}Zr_{0.3}Gd_{0.1}Y_{0.1}O_{3-\delta}$,
$Ba_{0.5}Sr_{0.5}Ce_{0.4}Zr_{0.4}Gd_{0.1}Y_{0.1}O_{3-\delta}$, or
$Ba_{0.5}Sr_{0.5}Ce_{0.7}Zr_{0.1}Gd_{0.1}Y_{0.1}O_{3-\delta}$.

12. A proton-conducting SOFC of claim 10, wherein the anode comprises the proton-conducting metal oxide and Ni or the proton-conducting metal oxide and NiO, where in the anode the volume ratio of Ni to the proton-conducting metal oxide ranges from 30:70: to 70:30.

13. A proton-conducting SOFC of claim 10, wherein the cathode comprises a mixed metal oxide of formula II:

$$GdPrBaCo_{2-z}Fe_zO_{5+\delta},$$

where z is a number from 0 to 1, inclusive, and δ is a number that varies such that the metal oxide composition is charge neutral.

14. The proton-conducting SOFC of claim 13, wherein in the mixed metal oxide of the cathode, z is 0 or 1.

15. The proton-conducting SOFC of claim 13, wherein in the mixed metal oxide of the cathode, z is 0.1 to 0.9.

16. The proton-conducting SOFC of claim 13, wherein in the proton-conducting metal oxide of the electrolyte, y1 is 0.1 to 0.3, y2=y3 and x is 0.4 to 0.6.

17. A method for generating electrical energy which comprises providing the proton-conducting SOFC cell of claim 10, contacting the anode with a fuel gas comprising hydrogen and contacting the cathode with an oxygen-containing gas at a temperature between 400-800° C.

18. The proton-conducting SOFC of claim 10, wherein y1 is 0.1 to 0.3, y2=y3 and x is 0.4 to 0.6.

19. A method for generating electrical energy which comprises providing a proton-conducting SOFC cell comprising:

a dense, solid, proton-conducting electrolyte between an anode and a cathode, wherein the electrolyte comprises the proton-conducting metal oxide of claim 1, contacting the anode with a fuel gas comprising hydrogen and contacting the cathode with an oxygen-containing gas at a temperature between 400-800° C.

20. The method of claim 19, wherein the cathode comprises a mixed metal oxide of formula II:

$GdPrBaCo_{2-z}Fe_zO_{5+\delta}$, where z is a number from 0 to 1, inclusive, and δ is a number that varies such that the metal oxide composition is charge neutral.

* * * * *